(12) United States Patent
Poon

(10) Patent No.: US 12,243,338 B1
(45) Date of Patent: Mar. 4, 2025

(54) METHOD AND APPARATUS FOR DATA PROCESSING, COMPUTER, STORAGE MEDIUM, AND PROGRAM PRODUCT

(71) Applicant: iCALC Holdings Limited, Hong Kong (CN)

(72) Inventor: HoMan Poon, Hong Kong (CN)

(73) Assignee: ICALC HOLDINGS LIMITED, Hong Kong (CN)

( * ) Notice: Subject to any disclaimer, the term of this patent is extended or adjusted under 35 U.S.C. 154(b) by 0 days.

(21) Appl. No.: 18/930,226

(22) Filed: Oct. 29, 2024

(30) Foreign Application Priority Data

Sep. 14, 2024 (CN) .......................... 202411295588.8

(51) Int. Cl.
| | |
|---|---|
| G06K 9/00 | (2022.01) |
| G06Q 30/0201 | (2023.01) |
| G06V 30/19 | (2022.01) |
| G06V 30/422 | (2022.01) |
| G07C 5/08 | (2006.01) |

(52) U.S. Cl.
CPC .................. *G06V 30/19173* (2022.01); *G06Q 30/0206* (2013.01); *G06V 30/1918* (2022.01); *G06V 30/422* (2022.01); *G07C 5/085* (2013.01)

(58) Field of Classification Search
CPC ............. G06Q 2220/00; G06Q 10/087; G06Q 30/0201; G06Q 30/0202; G06Q 30/0206; G06Q 10/0833; G06Q 10/06; G06Q 10/0633; G06N 20/00; G06N 3/08; G06N 20/10; G06N 20/20; G06N 3/084; G06N 3/088; G06N 3/09; G06N 3/006; G06N 5/025; G06N 3/0455; G06N 10/00; G06N 3/045; G06N 5/022; G06N 7/01;
(Continued)

(56) References Cited

U.S. PATENT DOCUMENTS

| | | | |
|---|---|---|---|
| 2014/0280952 A1* | 9/2014 | Shear | H04L 63/10 709/226 |
| 2018/0234707 A1* | 8/2018 | Pujia | H04N 21/4227 |

(Continued)

OTHER PUBLICATIONS

Zhong et al., LSTM-ReGAT: A network-centric approach for cryptocurrency price trend prediction, Decision Support Systems, vol. 169, 2023, 113955 (Year: 2023).*

*Primary Examiner* — Alex Kok S Liew
(74) *Attorney, Agent, or Firm* — HAUPTMAN HAM, LLP

(57) ABSTRACT

Disclosed are a method for data processing and a computer. The method includes the following. A service processing instruction and virtual asset-associated data of an aircraft are input to a target service processing model. Data division is performed on the virtual asset-associated data to obtain S unit virtual assets. Binary group classification information corresponding to each unit virtual assets is determined. Weight model parameters respectively corresponding to the S unit virtual assets are obtained. Data feature vectors are combined with the weight model parameters to obtain S fused feature vectors. A prompt text is generated, a target processing network is determined, and feature processing is performed on the S fused feature vectors and the prompt text via the target processing network, to obtain a feature processing result. The feature processing result is classified and recognized to obtain a data recognition result for responding to the service processing instruction.

20 Claims, 9 Drawing Sheets

(58) Field of Classification Search
CPC .......... G06N 5/01; G06N 10/60; G06N 3/049; G06N 5/043; G06N 3/04
See application file for complete search history.

(56) References Cited

U.S. PATENT DOCUMENTS

2023/0405468 A1* 12/2023 Brockett ................ G06N 20/00
2024/0025545 A1* 1/2024 Hayot .............. B64D 11/00155

* cited by examiner

METHOD AND APPARATUS FOR DATA PROCESSING, COMPUTER, STORAGE MEDIUM, AND PROGRAM PRODUCT

CROSS-REFERENCE TO RELATED APPLICATIONS

This application claims priority under 35 U.S.C. § 119 (a) to Chinese Patent Application No. 202411295588.8, filed Sep. 14, 2024, the entire disclosure of which is incorporated herein by reference.

TECHNICAL FIELD

This disclosure relates to the field of computer technologies, and in particular, to a method and an apparatus for data processing, a computer, a storage medium, and a program product.

BACKGROUND

Classification is widely applied in various fields, for example, image classification, natural language processing, medical diagnosis, etc., and classification can also be applied in data type recognition and data processing. Conventional methods for data classification or analysis require manual support. In the case that there are various types of data sources, manual analysis is not only inefficient and costly, but also it is difficult to find important data in different types of data sources. Furthermore, in the case where data types are complex, the accuracy of the finally obtained data classification or analysis result is low.

SUMMARY

Provided are a method and an apparatus for data processing and a computer.

In one aspect, embodiments of the disclosure provide a method for data processing. The method includes the following. A service processing instruction and virtual asset-associated data of an aircraft sent by a first service object are obtained, the service processing instruction and the virtual asset-associated data of the aircraft are input to a target service processing model, where the aircraft is composed of at least two components. An asset data classification rule is obtained, data division is performed on the virtual asset-associated data of the aircraft according to N service types in the asset data classification rule and the at least two components to obtain S unit virtual assets, and binary group classification information corresponding to each of the S unit virtual assets is determined, where the binary group classification information indicates a service type and a component to which a unit virtual asset belongs, and N and S are both positive integers. Weight model parameters respectively corresponding to the S unit virtual assets are obtained from a weight model parameter set in the target service processing model according to binary group classification information respectively corresponding to the S unit virtual assets, where the weight model parameter set includes H weight model parameters respectively representing different influence weights, each weight model parameter corresponds to one piece of binary group classification information, and H is a positive integer. Data feature vectors respectively corresponding to the S unit virtual assets are combined with the weight model parameters respectively corresponding to the S unit virtual assets to obtain fused feature vectors respectively corresponding to the S unit virtual assets; where a fused feature vector is composed of a data feature vector and a weight model parameter. A prompt text for indicating a recognition demand type is generated according to the service processing instruction, a target processing network corresponding to the recognition demand type is determined from the target service processing model according to the prompt text, and feature processing is performed on the S fused feature vectors and the prompt text via the target processing network, to obtain a feature processing result. The feature processing result is classified and recognized to obtain a data recognition result for responding to the service processing instruction.

In one aspect, embodiments of the disclosure provide another method for data processing. The method includes the following. A sample processing instruction, virtual asset sample data of a sample aircraft, and a sample recognition result are obtained, and the sample processing instruction and the virtual asset sample data of the sample aircraft are input to an initial service processing model, where the sample aircraft is composed of at least two sample components. An asset data classification rule is obtained, data division is performed on the virtual asset sample data of the sample aircraft according to N service types in the asset data classification rule and the at least two sample components to obtain R unit sample virtual assets, and sample binary group classification information corresponding to each of the R unit sample virtual assets is determined; where the sample binary group classification information indicates a service type and a sample component to which a unit sample virtual asset belongs, and N and R are both positive integers. A random initialization model parameter is allocated for the binary group classification information corresponding to each of the R unit sample virtual assets, and R initialization model parameters are determined as an initialization model parameter set. Sample feature vectors respectively corresponding to the R unit sample virtual assets and the initialization model parameters respectively corresponding to the R unit sample virtual assets are combined to obtain sample fused feature vectors respectively corresponding to the R unit sample virtual assets; where a sample fused feature vector is composed of a sample feature vector and an initialization model parameter. A sample prompt text indicating a sample recognition demand type is generated according to the sample processing instruction, a sample processing network corresponding to the sample recognition demand type is determined from the initial service processing model according to the sample prompt text, feature processing is performed on the R sample fused feature vectors and the sample prompt text via the sample processing network to obtain a sample feature processing result, and the sample feature processing result is classified and recognized to obtain a sample prediction result for responding to the sample processing instruction. A model loss value is generated according to the sample prediction result and the sample recognition result, and a target service processing model is obtained by adjusting each initialization model parameter in the initialization model parameter set and parameters of the sample processing network according to the model loss value until the initialization service processing model satisfies a model convergence condition; where the target service processing model includes a weight model parameter set, the weight model parameter set includes a weight model parameter obtained after adjusting the initialization model parameter.

In one aspect, embodiments of the disclosure provide a computer, including a processor, a memory, and an input/output interface. The processor is respectively connected to the memory and the input/output interface, the input/output interface is configured to receive and output data, the memory is configured to store a computer program, and the processor is configured to invoke the computer program to make the computer execute the method in one aspect of embodiments of the disclosure.

BRIEF DESCRIPTION OF THE DRAWINGS

To describe technical solutions in embodiments of the present disclosure or in the related art more clearly, the following briefly introduces accompanying drawings required for describing the embodiments or the related art. Apparently, the accompanying drawings in the following description show merely some embodiments of the present disclosure, and other accompanying drawings may also be obtained according to these accompanying drawings without creative efforts.

DETAILED DESCRIPTION

The following clearly and completely describes technical solutions in embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art according to the embodiments of the present disclosure without creative efforts shall belong to the scope of protection of the present disclosure.

If data of an object (such as a user) needs to be collected in the present disclosure, before collection and during collection, a prompt interface or a pop-up window is displayed, where the prompt interface or the pop-up window is used for prompting the user that some data is currently being collected, and only after obtaining a confirmation operation performed by the user on the prompt interface or the pop-up window, a relevant step of data obtaining is started, otherwise, the process ends. Furthermore, the obtained user data may be used in a reasonable and legal scene or use. Optionally, in some scenarios where the user data needs to be used but not authorized by the user, the user may also be requested for authorization, and the user data can be used in response to approval of the authorization.

It can be understood that, user data involved in embodiments of the present disclosure needs to obtain license or consent from the user when the following embodiments of the present disclosure are applied to a specific product or technology. Collection, use, and processing of association data need to comply with related legal regulations and standards of related regions.

Figure 1:
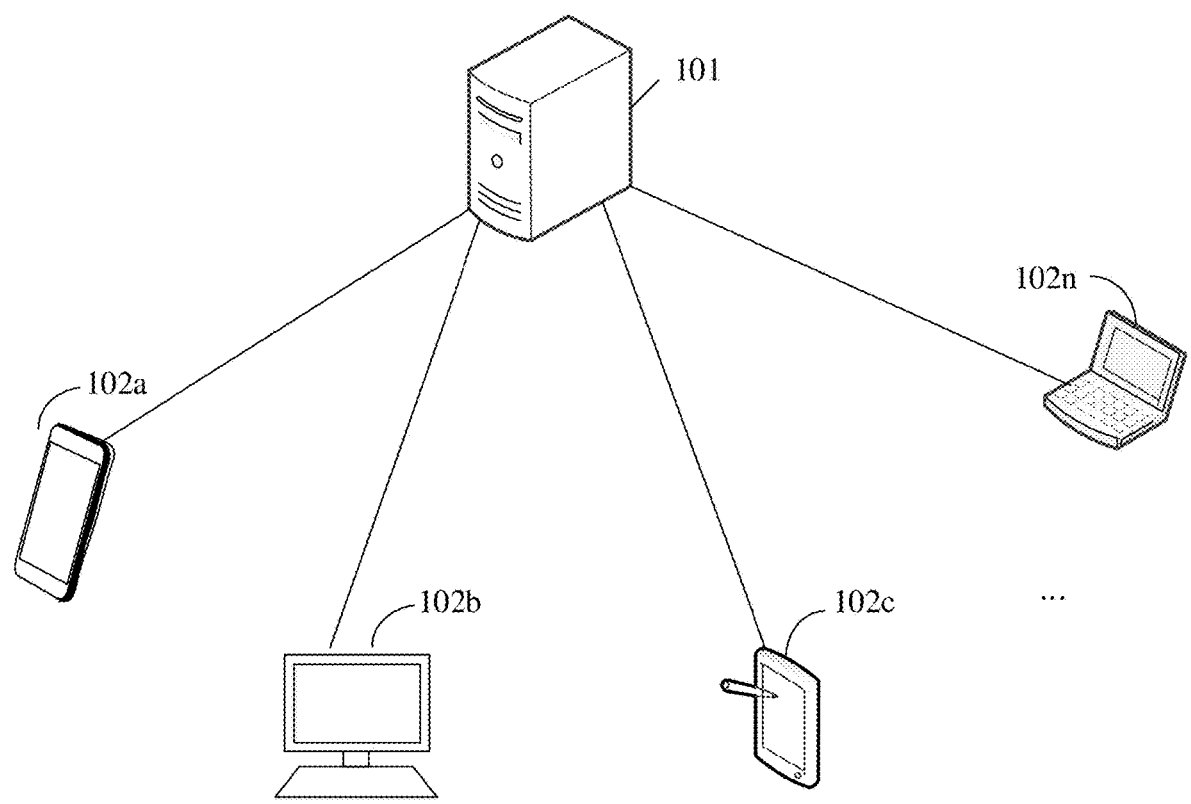
FIG. 1 is a diagram of a network interaction architecture provided in an embodiment of the present disclosure.

In an embodiment of the present disclosure, FIG. 1 is a diagram of a network interaction architecture provided in an embodiment of the present disclosure, as illustrated in FIG. 1, the network interaction architecture may include service server 101 and a terminal device cluster. The terminal device clusters may include terminal device 102a, terminal device 102b, terminal device 102c, . . . , terminal device 102n. A communication connection may exist in the terminal device clusters, for example, terminal device 102a has a communication connection exists with terminal device 102b, and terminal device 102a has a communication connection with terminal device 102c. Meanwhile, any terminal device in the terminal device cluster may have a communication connection with service server 101, for example, terminal device 102a has a communication connection with service server 101. The communication connection does not limit a connection manner, may be direct or indirect connection by means of wired communication, may also be direct or indirect connection by means of wireless communication, and the present disclosure is not limited thereto.

It is to be understood that each terminal device in the terminal device cluster illustrated in FIG. 1 may be installed with an application client having a data processing function. When the application client runs in each terminal device, the terminal device can display an intelligent session page and performs data interaction with service server 101 illustrated in FIG. 1, so that service server 101 can receive service data from each terminal device. The application client may be a social application, an instant messaging application, a live broadcast application, a short video application, a video application, a music application, a shopping application, a novel application, a browser and other application clients having data information displaying functions, such as displaying text, image, audio, and video. The application client may be an independent client, and may be an embedded sub-client (for example, an application applet, a browser web page access, and the like) integrated in a certain client (for example, an instant messaging client, a social client, a video client, and the like), which is not limited herein.

As illustrated in FIG. 1, any terminal device in the terminal device cluster can send a service processing instruction and virtual asset-associated data of an aircraft to service server 101, and for illustrative purpose, terminal device 102a is the terminal device corresponding to the first service object. Service server 101 obtains a service processing instruction and virtual asset-associated data of an aircraft sent by the terminal device 102c, and input the service processing instruction and the virtual asset-associated data of the aircraft to a target service processing model. The aircraft is composed of at least two components. It can be understood that the aircraft may be a transit device (for example, an airplane, etc.) used for navigation, and may also be relevant components that constitute the transit device. For example, when the aircraft is an airplane, the relevant components that constitute the airplane may include an engine, a fuselage, a landing gear, etc., and the components such as the engine, the fuselage, and the landing gear may all be used as the aircraft of the present disclosure. Service server 101 obtains an asset data classification rule, performs data division on the virtual asset-associated data of the aircraft according to N service types in the asset data classification rule and the at least two components to obtain S unit virtual assets, and determines binary group classification information corresponding to each of the S unit virtual assets. The binary group classification information indicates a service type and a component to which a unit virtual asset belongs, and N and S are both positive integers.

Service server 101 obtains weight model parameters respectively corresponding to the S unit virtual assets from a weight model parameter set in the target service processing model according to binary group classification information respectively corresponding to the S unit virtual assets. The weight model parameter set includes H weight model parameters respectively representing different influence weights, each weight model parameter corresponds to one piece of binary group classification information, and H is a positive integer. The value of H is determined by the number of components constituting the aircraft and the number of N service types, for example, the N service types are three service types, the components constituting the aircraft include component 1 and component 2, i. e. the number of components is two, and then the value of H may be equal to six.

Service server 101 combines data feature vectors respectively corresponding to the S unit virtual assets with the weight model parameters respectively corresponding to the S unit virtual assets to obtain fused feature vectors respectively corresponding to the S unit virtual assets; where a fused feature vector is composed of a data feature vector and a weight model parameter. For example, the S unit virtual assets include unit virtual asset a, unit virtual asset b, unit virtual asset c; data feature vectors respectively corresponding to the S unit virtual assets include data feature vector 1*a*, data feature vector 1*b*, data feature vector 1*c*; and weight model parameters respectively corresponding to the S unit virtual assets include weight model parameter 2*a*, weight model parameter 2*b*, and weight model parameter 2*c*. Data feature vector 1*a* and weight model parameter 2*a* correspond to unit virtual asset a, and data feature vector 1*b* and weight model parameter 2*b* correspond to unit virtual asset b, data feature vector 1*c* and weight model parameter 2*c* correspond to unit virtual asset c. Service server 101 may combine data feature vector 1*a* and weight model parameter 2*a* to obtain a fused feature vector corresponding to unit virtual asset a, combine data feature vector 1*b* and weight model parameter 2*b* to obtain a fused feature vector corresponding to unit virtual asset b, and combine data feature vector 1*c* and weight model parameter 2*c* to obtain a fused feature vector corresponding to unit virtual asset c.

Service server 101 generates a prompt text for indicating a recognition demand type according to the service processing instruction, determines a target processing network corresponding to the recognition demand type from the target service processing model according to the prompt text, and performs feature processing on the S fused feature vectors and the prompt text via the target processing network, to obtain a feature processing result. For example, the service processing instruction may be "Please predict the price of aircraft XX according to data uploaded by me". The prompt text may indicate key semantic information in the service processing instruction, for example, "predict the price of aircraft XX". The recognition demand type indicated by the prompt text may be a price prediction demand, and according to the price prediction demand, a target processing network corresponding to the price prediction demand may further be selected from multiple processing networks in the target service processing model. Further, after performing feature processing on the S fused feature vectors and the prompt text via the target processing network to obtain a feature processing result, service server 101 classifies and recognizes the feature processing result to obtain a data recognition result for responding to the service processing instruction. For example, when the service processing instruction is "Please predict a price of aircraft XX by using data uploaded by me", the data recognition result may be a predicted price for aircraft XX.

By means of the described process, the asset data classification rule and the service processing instruction are used to realize targeted processing on virtual asset-associated data, which can improve the service processing efficiency and save time. Virtual asset-associated data is divided by means of the asset data classification rule, so that a service type and a component (binary group classification information) to which a unit virtual asset belongs can be obtained. By fully utilizing weight information (a weight model parameter) of binary group classification information about a unit virtual asset, important data suitable for the recognition demand type can be better found by means of the weight model parameter, thereby improving an influence ratio of the important data, being able to better deal with a service processing problem in the case of complex data, and improving the recognition accuracy of a final data recognition result.

Figure 2:
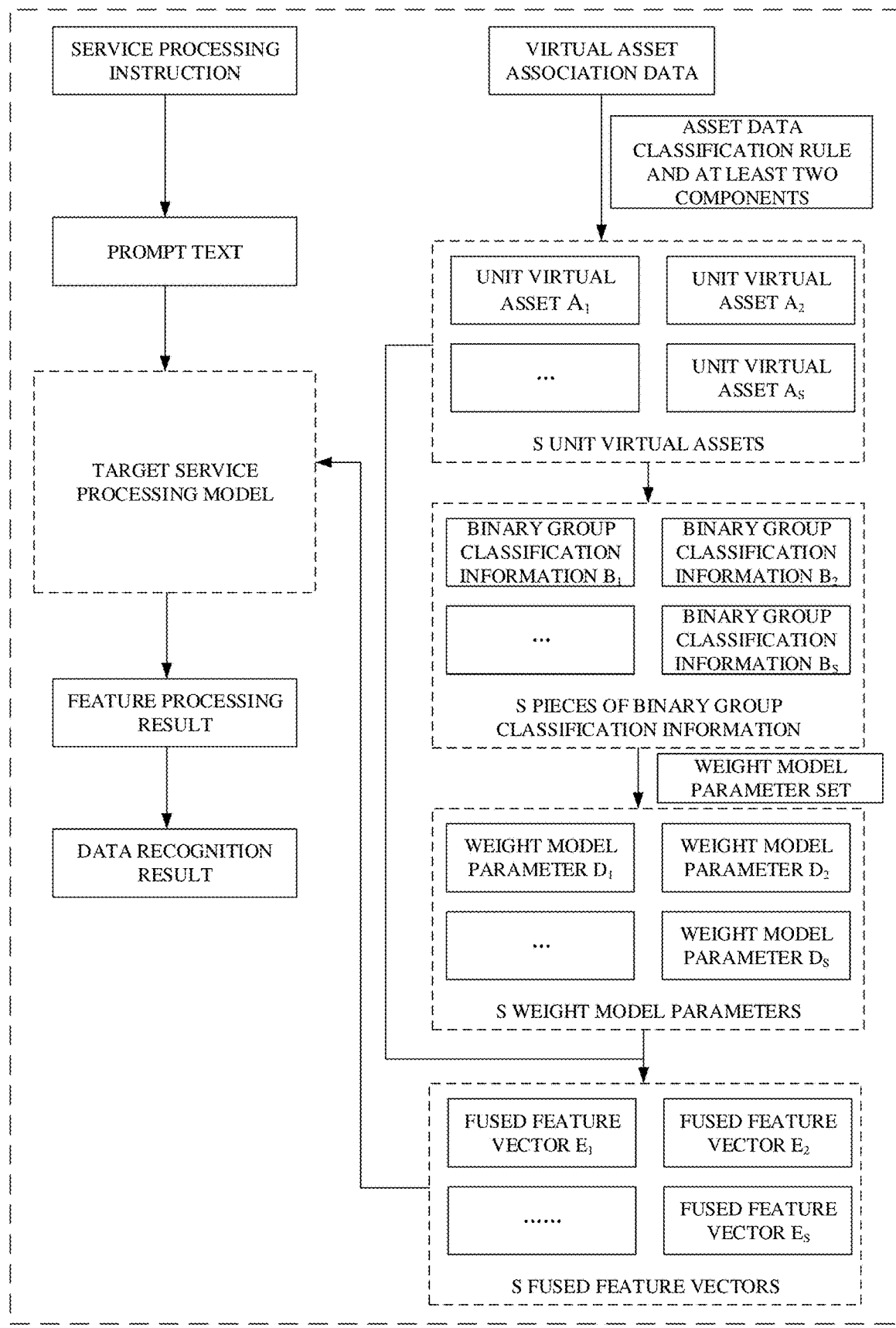
FIG. 2 is a schematic diagram of a scenario of a method for data processing provided in an embodiment of the present disclosure.

Specifically, FIG. 2 is a schematic diagram of a scenario of a method for data processing provided in an embodiment of the present disclosure, as illustrated in FIG. 2, service server 101 can input an obtained service processing instruction and virtual asset-associated data of an aircraft into a target service processing model, where the aircraft is composed of at least two components. Service server 101 obtains an asset data classification rule, performs data division on the virtual asset-associated data of the aircraft according to N service types in the asset data classification rule and the at least two components to obtain S unit virtual assets (including unit virtual asset $A_1$, unit virtual asset $A_2$, and unit virtual asset $A_s$). Service server 101 further determines the binary group classification information corresponding to each unit virtual asset, to obtain S pieces of binary group classification information (including binary group classification information $B_1$, binary group classification information $B_2$, . . . , binary group classification information Bs). The binary group classification information indicates a service type and a component to which a unit virtual asset belongs, where N and S are both positive integers. For example, unit virtual asset $A_1$ belongs to service type 3 of N service types (the N service types include service type 1, service type 2, and service type 3), and belongs to component 2 constituting the aircraft (including component 1 and component 2), and binary group classification information $B_1$ corresponding to unit virtual asset $A_1$ is (service type 3 and component 2). Service server 101 obtains weight model parameters (i.e., S weight model parameters) respectively corresponding to the S unit virtual assets from a weight model parameter set in the target service processing model according to binary group classification information respectively corresponding to the S unit virtual assets, to obtain weight model parameter $D_1$, weight model parameter $D_2$, . . . , and weight model parameter Ds. The weight model parameter set includes H weight model parameters respectively representing different influence weights, each weight model parameter corresponds to one piece of binary group classification information, and H is a positive integer. The weight model parameter set may include a weight model parameter corresponding to binary group classification information (service type 1, component 1), binary group classification information (service type 1, component 2), binary group classification information (service type 2, component 1), binary group classification information (service type 2, component 2), binary group classification information (service type 3, component 1), and binary group classification information (service type 3, component 1).

Further, service server 101 combines data feature vectors respectively corresponding to the S unit virtual assets with the weight model parameters respectively corresponding to the S unit virtual assets to obtain fused feature vectors respectively corresponding to the S unit virtual assets. A fused feature vector is composed of a data feature vector and a weight model parameter. Namely, service server 101 combines data feature vector F1 corresponding to unit virtual assets $A_1$ to obtain fused feature vector $E_1$, combines data feature vector F2 corresponding to unit virtual asset $A_2$ to obtain a fused feature vector $E_2$, and so on, until fused feature vector Es is obtained by combining data feature vector FS corresponding to unit virtual asset As. In this way, S fused feature vectors are obtained. Service server 101 generates a prompt text for indicating a recognition demand type according to the service processing instruction, determines a target processing network corresponding to the recognition demand type from the target service processing model according to the prompt text, and performs feature processing on the S fused feature vectors and the prompt text via the target processing network, to obtain a feature processing result. The prompt text may be key semantic information in the service processing instruction. Service server 101 classifies and recognizes the feature processing result to obtain a data recognition result for responding to the service processing instruction.

By means of the described process, the asset data classification rule and the service processing instruction are used to realize targeted processing on virtual asset-associated data, which can improve the service processing efficiency and save time. Virtual asset-associated data is divided by means of the asset data classification rule, so that a service type and a component (binary group classification information) to which a unit virtual asset belongs can be obtained. By fully utilizing weight information (a weight model parameter) of binary group classification information about a unit virtual asset, important data suitable for the recognition demand type can be better found by means of the weight model parameter, thereby improving an influence ratio of the important data, being able to better deal with a service processing problem in the case of complex data, and improving the recognition accuracy of a final data recognition result.

It may be understood that the terminal device mentioned in embodiments of the present disclosure may also be a computer, and the computer in embodiments of the present disclosure includes, but is not limited to, a terminal device or a server. In other words, the computer may be a server or a terminal device, and may be a system including a server and a terminal device. The terminal device mentioned above may be an electronic device, including but not limited to a mobile phone, a tablet computer, a desktop computer, a notebook computer, a palmtop computer, a vehicle-mounted device, an augmented reality (AR)/virtual reality (VR), a helmet display, a smart television, a wearable device, a smart sound box, a digital camera, a camera and other mobile internet devices (MIDs) having a network access capability, or a terminal device in scenarios such as train, ship, and flight. As illustrated in FIG. 1, the terminal device may be a mobile phone (such as terminal device 102a), a desktop computer (such as terminal device 102b), a tablet computer (such as terminal device 102c), a notebook computer (such a terminal device 102n), or the like. FIG. 1 only illustrates some devices. The server may be an independent physical server, a server cluster or a distributed system constituted by multiple physical servers, or a cloud server that can basic cloud computing services, such as cloud service, cloud database, cloud computing, cloud function, cloud storage, network service, cloud communication, middleware service, domain name service, security service, lane collaboration, content delivery network (CDN), big data, or artificial intelligence platform.

Figure 3:
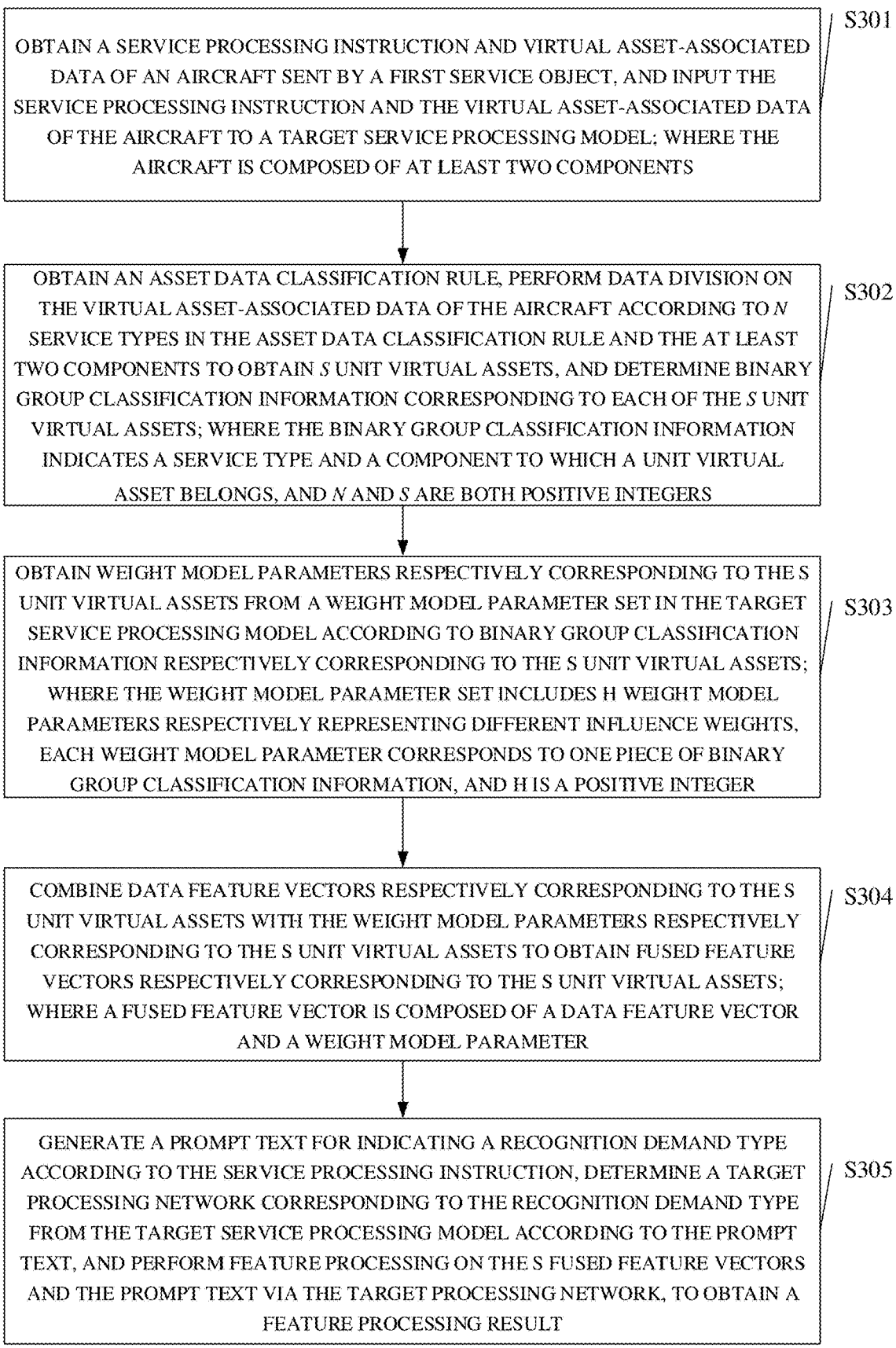
FIG. 3 is a schematic flowchart of a method for data processing provided in an embodiment of the present disclosure.

Further, FIG. 3 is a schematic flowchart of a method for data processing provided in an embodiment of the present disclosure. The method for data processing may be performed by a computer, and the computer may be service server 101 or any terminal device in a terminal device cluster illustrated in FIG. 1. For illustrative purpose, the method for data processing is performed by a computer. The method for data processing may at least include the following operations at S301-S305.

At S301, a service processing instruction and virtual asset-associated data of an aircraft sent by a first service object are obtained, the service processing instruction and the virtual asset-associated data of the aircraft are input to a target service processing model, where the aircraft is composed of at least two components.

In embodiments of the present disclosure, the computer can obtain the service processing instruction and the virtual asset-associated data of the aircraft sent by a first service object, where the aircraft is composed of at least two components. For example, the aircraft is an engine, the virtual asset-associated data of the aircraft may include usage data of components of the engine (for example, the components are installed in the engine, and the engine is installed in an airplane, the usage data includes flight-associated data, such as flight duration, flight area, etc.) evidence data of accidents (such as fire, water ingress, drop) of components of the engine, and asset depreciation data of components of the engine (for example, when the components are installed in an engine and the engine is installed in an airplane, different flight areas lead to different flight depreciation rates; and because the worse environment affects the performance of the engine more, different flight areas lead to different flight depreciation rates) and historical maintenance data of the components of the engine (e. g., maintenance time, maintenance position, recovery performance ratio after maintenance of components, etc.,), and ownership certificate data of components of the engine (for example, factory license certificate, production license certificate, vendor, component flight-approval certificate, etc.,), transaction data of components of the engine (e. g., lease-associated data of components, such as lease period, lease price, and return states after lease; trading-associated data of components, such as trading amount of the components, trading time, etc.; and refit-associated data, such as refit fee, refit time of components, etc.). The virtual asset-associated data (including usage data, evidence data of accidents, asset depreciation data, historical maintains data, ownership certificate data, transaction data, etc.) of the components of the engine collectively constitute the virtual asset-associated data of the engine. It can be understood that the computer may translate the virtual asset-associated data of the aircraft from the first service object into a trusted asset credential (Tokenization) by using a manner of real world asset Tokenization (RWA), and up link the trusted asset credential to a block chain such that when the first service object needs to transfer the virtual asset-associated data of the aircraft to the second service object, transfer of ownership to the aircraft may be achieved by transferring the trusted asset credential over the block chain. The transfer of ownership may be understood as transfer of accessory rights to an item.

The computer may input the service processing request and virtual asset-associated data of the aircraft to a target service processing model. The target service processing model is configured to perform corresponding service processing on virtual asset-associated data of the aircraft in response to a service processing request, to obtain a result that responds to the service processing request.

At S302, an asset data classification rule is obtained, data division is performed on the virtual asset-associated data of the aircraft according to N service types in the asset data classification rule and the at least two components to obtain S unit virtual assets, and binary group classification information corresponding to each of the S unit virtual assets is determined, where the binary group classification information indicates a service type and a component to which a unit virtual asset belongs, and N and S are both positive integers.

In embodiments of the present disclosure, the computer can obtain an asset data classification rule, where N service types can respectively be an asset service data type, a basic service data type, and a transaction service data type. For example, the aircraft is an airplane, and two components constituting the airplane are an engine and a landing gear. The computer performs data division on the virtual asset-associated data of the aircraft according to N service types in the asset data classification rule and the at least two components to obtain S unit virtual assets as follows. The computer divides the virtual asset-associated data of the aircraft into three types of data according to the asset service data type, the basic service data type, and the transaction service data type. The three types of data are further divided according to the engine and the landing gear. For example, classified data corresponding to the asset service data type includes virtual asset-associated data 1, virtual asset-associated data 2, and virtual asset-associated data 3, virtual asset-associated data 1 belongs to the landing gear, and virtual asset-associated data 2 and virtual asset-associated data 3 belong to the engine. The computer classifies virtual asset-associated data 1 into the landing gear under the asset service data type, and classifies virtual asset-associated data 2 and virtual asset-associated data 3 into engine under an asset service data type, so as to obtain three unit virtual assets under the asset service data type. It should be noted that the unit virtual asset may be the virtual asset-associated data itself, and may be a token sequence) obtained after tokenization is performed on the virtual asset-associated data. It can be understood that, the computer may perform tokenization on each piece of virtual asset-associated data in advance to obtain a corresponding token sequence (there is a unique mapping relationship between the virtual asset-associated data and the token sequences), and stores the token sequence in a block chain or a database. After the computer divides the virtual asset-associated data, the computer can directly obtain a token sequence corresponding to the virtual asset-associated data from the database or the block chain as a unit virtual asset. Alternatively, when the computer divides the virtual asset-associated data, the computer directly performs tokenization on the divided virtual asset-associated data to obtain a corresponding token sequence, and determines the token sequence as a unit virtual asset. Further, the computer may obtain a service type and a component to which each unit virtual asset belongs, and combine the service type and component into the binary group classification information of the unit virtual asset. For example, the binary group classification information of virtual asset-associated data 1 is (asset service data type, landing gear), the binary group classification information of virtual asset-associated data 2 is (asset service data type, engine), and the binary group classification information of virtual asset-associated data 3 is (asset service data type, engine).

Alternatively, the virtual asset-associated data can be associated with corresponding RWA data, that is, the computer associates data with the virtual asset for the air, after the computer performs data division on the virtual asset-associated data of the aircraft according to N service types and the at least two components, trusted asset credentials of different unit asset data can be classified and stored on the block chain according to the N service types and components. The trusted asset credential belongs to the RWA data and may enable asset transfer or ownership transfer over a block chain. For example, the asset data corresponding to the trusted asset credential may be transferred to another service object by transferring the trusted asset credential to another service object. The virtual asset-associated data sent by the first service object may carry a trusted asset credential, and the computer may detect, on the block chain, whether the trusted asset credential carried by the virtual asset-associated data exists in a block or not. If the computer detects that the trusted asset credential exists in the corresponding block, the computer determines the virtual asset-associated data corresponding to the trusted asset credential as unit asset data, so as to obtain S divided unit virtual assets.

At S303, weight model parameters respectively corresponding to the S unit virtual assets are obtained from a weight model parameter set in the target service processing model according to binary group classification information respectively corresponding to the S unit virtual assets, where the weight model parameter set includes H weight model parameters respectively representing different influence weights, each weight model parameter corresponds to one piece of binary group classification information, and H is a positive integer.

In embodiments of the present disclosure, the computer may determine and obtain weight model parameters corresponding to the binary group classification information respectively corresponding to S unit virtual assets from the weight model parameters according to a mapping relationship between the weight model parameters and the binary group classification information. The weight model parameter set can be obtained when the computer performs model training on an initial service processing model, the weight model parameter set includes H weight model parameters respectively representing different influence weights, each weight model parameter corresponds to one piece of binary group classification information, and H is a positive integer.

At S304, data feature vectors respectively corresponding to the S unit virtual assets are combined with the weight model parameters respectively corresponding to the S unit virtual assets to obtain fused feature vectors respectively corresponding to the S unit virtual assets; where a fused feature vector is composed of a data feature vector and a weight model parameter.

In embodiments of the present disclosure, the target service processing model may include a multimodal feature extraction component (for example, contrastive language-image pre-training (CLIP)), and the computer may perform feature extraction on each of the S units of virtual assets through the multimodal feature extraction component to obtain data feature vectors corresponding to the S units of virtual assets respectively. The CLIP not only can process text, but also can process contents of images, videos and other formats, and can help the target service processing model to quickly determine data feature vectors corresponding to different types of unit virtual assets. The computer can determine the association degree between each of the S unit virtual assets and the recognition demand type indicated by the service processing instruction. The association degree indicates the correlation between the two, and the computer can obtain the association degree between the unit virtual asset and the recognition demand type by calculating an attention score, a vector similarity, or a Pearson correlation coefficient between the unit virtual asset and the recognition demand type, which is not limited here. Further, the computer may allocate different data association weights to the S unit virtual assets according to different association degrees, for example, by means of linear allocation or exponential allocation according to the association degrees. It can be understood that greater association degree leads to greater data association weight. The computer may combine data feature vectors respectively corresponding to S unit virtual assets, data association weights respectively corresponding to the S unit virtual assets, and weight model parameters respectively corresponding to the S unit virtual assets to obtain fused feature vectors respectively corresponding to the S unit virtual assets. A fused feature vector is composed of a data feature vector, a data association weight, and a weight model parameter. For example, for unit virtual asset x, the fused feature vector corresponding to unit virtual asset x is composed of a data feature vector corresponding to unit virtual asset x, a data association weight corresponding to unit virtual asset x, and a weight model parameter corresponding to unit virtual asset x.

At S305, a prompt text for indicating a recognition demand type is generated according to the service processing instruction, a target processing network corresponding to the recognition demand type is determined from the target service processing model according to the prompt text, and feature processing is performed on the S fused feature vectors and the prompt text via the target processing network, to obtain a feature processing result. The feature processing result is classified and recognized to obtain a data recognition result for responding to the service processing instruction.

In embodiments of the present disclosure, the computer can invoke a natural language processing component to analyze the service processing instruction with the natural language processing component, to obtain the prompt text for indicating the recognition demand type. For example, if the service processing instruction may be "Please predict the price of aircraft XX according to the data uploaded by me", the prompt text may be "predict the price of aircraft XX". The recognition demand type indicated by the prompt text may be a price prediction demand. Furthermore, the computer can determine the target processing network corresponding to the recognition demand type from the target service processing model according to the prompt text. It can be understood that the target service processing model includes multiple service processing networks. The computer can select a required service processing network from the multiple service processing networks as the target processing network according to a recognition demand type. The computer performs feature processing on the S fused feature vectors and the prompt text via the target processing network, to obtain the feature processing result. Further, the computer classifies and identifies the feature processing result to obtain a data recognition result for responding to the service processing instruction.

In the described process, by means of the target service processing model, the virtual asset-associated data is classified by using the asset data classification rule and the at least two components, a service type and a component (binary group classification information) to which a unit virtual asset belongs can be obtained, which can achieve data classification without human interference, and then save manpower costs. By fully utilizing weight information (a weight model parameter) of binary group classification information about a unit virtual asset, important data suitable for the recognition demand type can be better found by means of the weight model parameter, thereby improving an influence ratio of the important data, being able to better deal with a service processing problem in the case of complex data, and improving the recognition accuracy of a final data recognition result. Furthermore, according to the prompt text generated based on the service processing instruction, the target processing network can be determined from the target service processing model, so as to realize targeted processing on the unit virtual asset, thereby improving the service processing efficiency and saving time.

Figure 4:
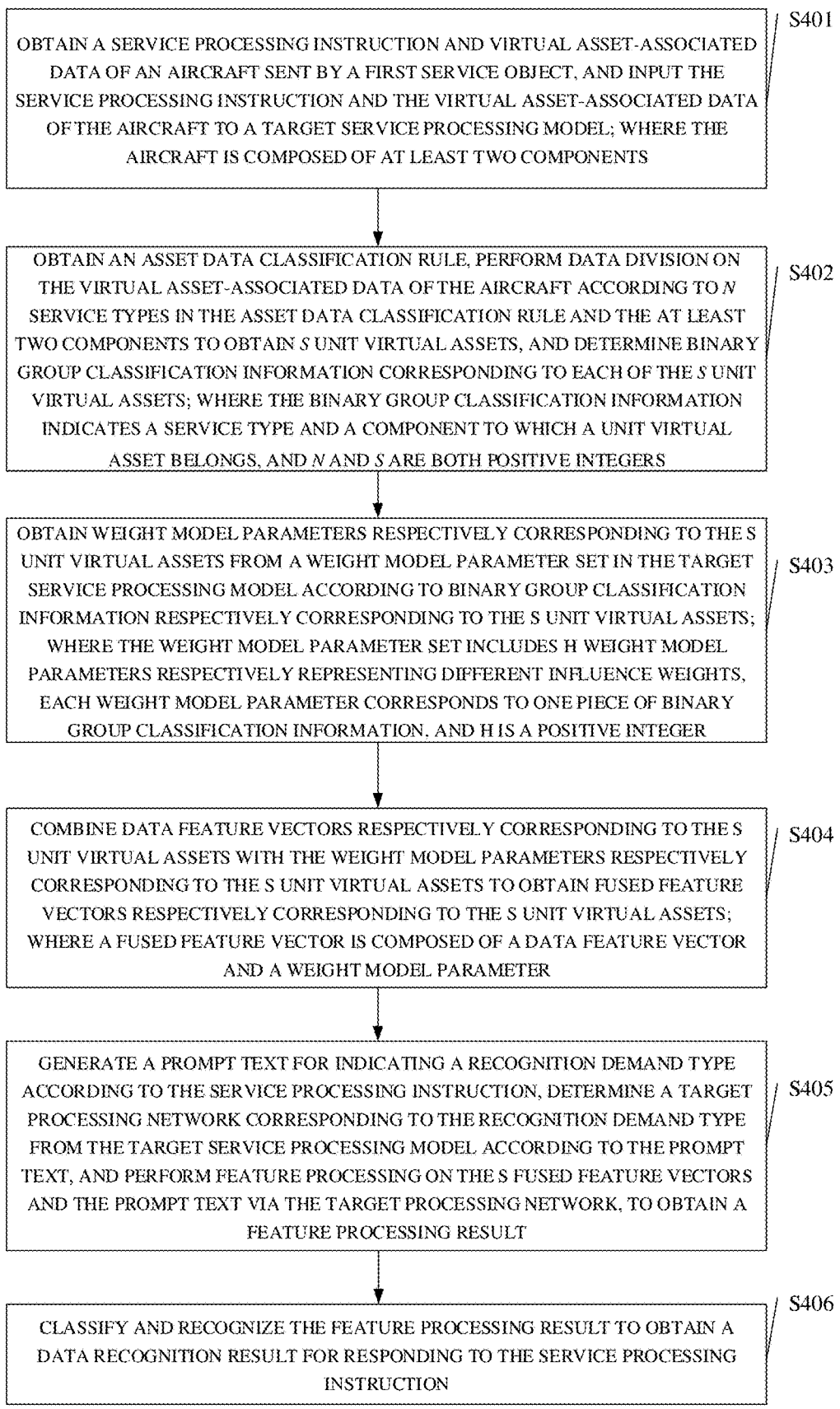
FIG. 4 is a schematic flowchart of a method for data processing provided in another embodiment of the present disclosure.

Further, reference is made to FIG. 4, which is a schematic flowchart of a method for data processing provided in another embodiment of the present disclosure. The method for data processing may be performed by a computer, and the computer may be service server 101 or any terminal device in a terminal device cluster illustrated in FIG. 1. For illustrative purpose, the method for data processing is performed by a computer. where the method for data processing may at least include operations at S401-S406.

At S401, a service processing instruction and virtual asset-associated data of an aircraft sent by a first service object are obtained, the service processing instruction and the virtual asset-associated data of the aircraft are input to a target service processing model, where the aircraft is composed of at least two components.

In embodiments of the present disclosure, for the specific implementation process of operations at S401, reference may be made to the specific description of operations at S301 illustrated in FIG. 3, which is not repeated herein.

At S402, an asset data classification rule is obtained, data division is performed on the virtual asset-associated data of the aircraft according to N service types in the asset data classification rule and the at least two components to obtain S unit virtual assets, and binary group classification information corresponding to each of the S unit virtual assets is determined, where the binary group classification information indicates a service type and a component to which a unit virtual asset belongs, and N and S are both positive integers.

In embodiments of the present disclosure, the computer can obtain the asset data classification rule, classify the virtual asset-associated data of the aircraft according to N service types in the asset data classification rule, and obtain M types of classified data. Service types respectively corresponding to the M types of classified data belong to N service types, where M is a positive integer less than or equal to N. Specifically, the N service types include an asset service data type, a basic service data type, and a transaction service data type. If M being equal to N, the M types of classified data include first classified data, second classified data and third classified data. The computer can obtain a data key field corresponding to the asset service data type, where the data key field includes a usage record key field, a maintenance record key field, and a depreciation record key field. The computer can obtain, from the virtual asset-associated data of the aircraft, a historical usage record corresponding to the usage record key field, a historical maintenance record corresponding to the maintenance record key field, and a historical depreciation record corresponding to the depreciation record key field, and determine the historical usage record, the historical maintenance record, and the historical depreciation record as the first classified data corresponding to the asset service data type. The computer can obtain a factory key field corresponding to the basic service data type, obtain, from the virtual asset-associated data of the aircraft, factory-associated data corresponding to the factory key field, and determine the factory-associated data as the second classified data corresponding to the basic service data type. The computer can obtain a transaction key field corresponding to the transaction service data type, obtain, from the virtual asset-associated data of the aircraft, transaction-associated data corresponding to the transaction key field, and determine the transaction-associated data as the third classified data corresponding to the transaction service data type.

It can be understood that service types may respectively correspond to different key fields, and each key field may correspond to one type of data. According to different key fields, data that belongs to different service types may be obtained from the virtual asset-associated data of the aircraft. For example, the asset service data type may correspond to the usage record key field, the maintenance record key field, and the depreciation record key field. According to the usage record key field, a historical usage record (e. g. a historical usage record of each component of the aircraft) can be obtained from the virtual asset-associated data of the aircraft. According to the maintenance record key field, a historical maintenance record (e. g., a historical maintenance record of each component of the aircraft) can be obtained from the virtual asset-associated data of the aircraft. According to the depreciation record key field, a historical depreciation record (e. g., historical accident record of each component of the aircraft) can be obtained from the virtual asset-associated data of the aircraft. However, the historical usage record, the historical maintenance record, and the historical depreciation record can all be taken as data corresponding to the asset service type. If the basic service data type corresponds to the factory key field, factory-associated data (such as a factory license certificate and a production license certificate) can be obtained from the virtual asset-associated data of the aircraft according to the factory key field; If transaction service data type corresponds to the transaction key field, transaction-associated data (for example, data such as lease price, lease period, and return state after lease) may be obtained from virtual asset-associated data of the aircraft according to the transaction key field.

Figure 5:
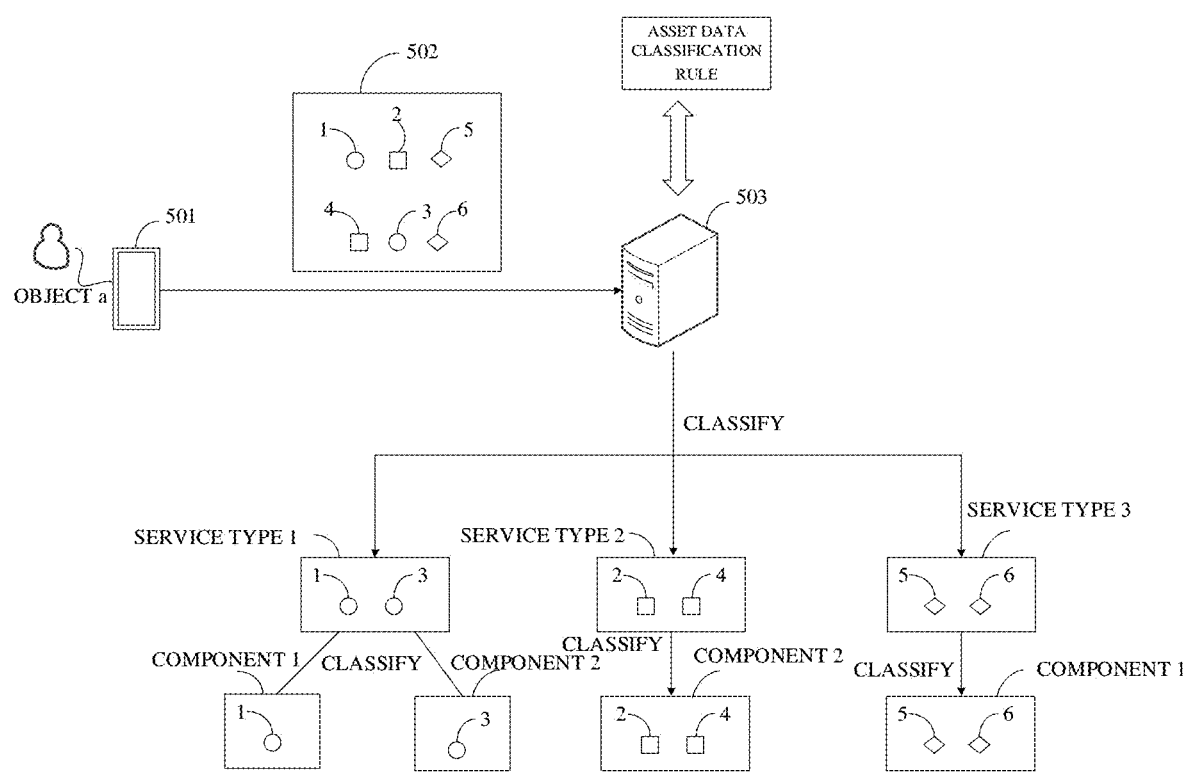
FIG. 5 is a schematic diagram of data classification provided in an embodiment of the present disclosure.

Further, the computer may perform, in each type of classified data, component division on each type of classified data according to at least two components to obtain S unit virtual assets. A unit virtual asset corresponds to a service type and a component. Further, reference may be made to FIG. 5, which is a schematic diagram of data classification provided in an embodiment of the present disclosure. As illustrated in FIG. 5, terminal device 501 may be terminal device 102a, object a may be the first service object, which may send virtual asset-associated data 502 of the aircraft (consisting of component 1 and component 2) to computer 503. Virtual asset-associated data 502 of the aircraft can include virtual asset-associated data 1, virtual asset-associated data 2, virtual asset-associated data 3, virtual asset-associated data 4, virtual asset-associated data 5, and virtual asset-associated data 6. After receiving virtual asset-associated data 502 of the aircraft, computer 503 may obtain an asset data classification rule, where the asset data classification rule includes N service types (including service type 1, service type 2, and service type 3) used for data classification. Further, computer 503 can classify virtual asset-associated data 502 of the aircraft according to the service types in the asset data classification rule. As illustrated in FIG. 5, computer 503 may obtain, from virtual asset-associated data 502 of the aircraft (including virtual asset-associated data 1, virtual asset-associated data 2, virtual asset-associated data 3, virtual asset-associated data 4, virtual asset-associated data 5, and virtual asset-associated data 6), virtual asset-associated data (including virtual asset-associated data 1 and virtual asset-associated data 3) of which the service type is service type 1, virtual asset-associated data (including virtual asset-associated data 2 and virtual asset-associated data 4) of which the service type is service type 2, and virtual asset-associated data (including virtual asset-associated data 5 and virtual asset-associated data 6) of which the service type is service type 3.

As illustrated in FIG. 5, virtual asset-associated data of a service type may be used as a type of classified data. According to service type 1, service type 2, and service type 3, the virtual asset-associated data of an item may be classified into three types of classified data. The three types of classified data may include classified data of service type 1 (including virtual asset-associated data 1 and virtual asset-associated data 3), classified data of service type 2 (including virtual asset-associated data 2 and virtual asset-associated data 4), and classified data of service type 3 (including virtual asset-associated data 5 and virtual asset-associated data 6). Further, the computer performs component division on each type of classified data according to the components of the aircraft (including component 1 and component 2). For example, with regard to classified data of service type 1, since virtual asset-associated data 1 is virtual asset-associated data for component 1, and virtual asset-associated data 3 is virtual asset-associated data for component 2, the classified data of service type 1 may be subdivided into two types of data (one type being virtual asset-associated data 1 belonging to component 1, and the other type being virtual asset-associated data 3 belonging to component 2). Likewise, with regard to the classified data of service type 2, since both virtual asset-associated data 2 and virtual asset-associated data 4 are virtual asset-associated data of component 2, the classified data of service type 2 can be subdivided into one type of data (virtual asset-associated data 2 and virtual asset-associated data 4 of component 2). Likewise, with regard to the classified data of service type 3, since both the virtual asset-associated data 5 and the virtual asset-associated data 6 are virtual asset-associated data of component 1, the classified data of service type 3 can be subdivided into one type of data (the virtual asset-associated data 5 and the virtual asset-associated data 6 belonging to component 1).

The six pieces of virtual asset-associated data are divided into four types of data (including six unit virtual assets) according to service types and the components. The computer can determine six pieces of virtual asset-associated data as six unit virtual assets; and can alternatively respectively perform tokenization on the six virtual asset-associated data to obtain six token sequence, and determine the six token sequence as six unit virtual assets. Further, the computer may respectively obtain service types and components corresponding to the S unit virtual assets, combine the service types and components corresponding to the S unit virtual assets to obtain the binary group classification information respectively corresponding to the S unit virtual assets. For example, the binary group classification information corresponding to the unit virtual asset corresponding to virtual asset-associated data 1 illustrated in FIG. 5 is (service type 1, component 1).

At S403, weight model parameters respectively corresponding to the S unit virtual assets are obtained from a weight model parameter set in the target service processing model according to binary group classification information respectively corresponding to the S unit virtual assets, where the weight model parameter set includes H weight model parameters respectively representing different influence weights, each weight model parameter corresponds to one piece of binary group classification information, and His a positive integer.

In the embodiment of the present disclosure, the binary group classification information respectively corresponding to the S units of virtual assets includes binary group classification information Bi, where i is a positive integer less than or equal to S. the computer can obtain the weight model parameter set and a parameter matching rule in the target service processing model, where the parameter matching rule indicates a mapping relationship between weight model parameters in the weight model parameter set and binary group classification information. For example, when the N service types include service type 1, service type 2, and service type 3, and the components constituting the aircraft include component 1 and component 2, the parameter matching rule may be illustrated in Table 1:

TABLE 1

| binary group classification information | weight model parameter |
|---|---|
| (service type 1, component 1) | parameter G1 |
| (service type 1, component 2) | parameter G2 |
| (service type 2, component 1) | parameter G3 |
| (service type 2, component 2) | parameter G4 |
| (service type 3, component 1) | parameter G5 |
| (service type 3, component) | parameter G6 |

It can be noted that the weight model parameter may be a vector, and the computer can determine a binary group classification information set according to a weight model parameter set and a parameter matching rule. The binary group classification information set may include (service type 1, component 1), (service type 1, component 2), (service type 2, component 1), (service type 2, component 2), (service type 3, component 1), and (service type 3, component 2). The computer may determine the binary group classification information that matches binary group classification information Bi in the binary group classification information set as the target binary group classification information. According to the target binary group classification information and the parameter matching rule, the computer may obtain a target weight model parameter corresponding to the target binary group classification information from the weight model parameter, and determine the target weight model parameter as the weight model parameter corresponding to binary group classification information Bi. For example, when binary group classification information Bi is (service type 2, component 2), the weight model parameter corresponding to binary group classification information Bi may be parameter G4. The weight model parameter set includes H weight model parameters respectively representing different influence weights, each weight model parameter corresponds to one piece of binary group classification information, and H is a positive integer. The value of His determined by the N service types and the components constituting the aircraft, for example, N is 3 and the number of components constituting the aircraft is 5, then H may be 15. It can be understood that the binary group classification information set corresponding to the weight model parameter set includes but is not limited to binary group classification information respectively corresponding to the S unit virtual assets obtained after data division performed on the virtual asset-associated data of the aircraft sent by the first service object. For example, the binary group classification information set may include (service type 1, part 1), (service type 1, part 2), (service type 2, part 1), (service type 2, part 2), (service type 3, part 1), (service type 3, part 2)". However, the 2-tuple classification information respectively corresponding to the S unit virtual assets may only include "(service type 1, component 1), (service type 2, component 1), (service type 2, component 2), and (service type 3, component 1).

At S404, data feature vectors respectively corresponding to the S unit virtual assets with the weight model parameters respectively corresponding to the S unit virtual assets are combined to obtain fused feature vectors respectively corresponding to the S unit virtual assets; where a fused feature vector is composed of a data feature vector and a weight model parameter.

In embodiments of the present disclosure, S unit virtual assets include unit virtual asset Ai, and data feature vectors respectively corresponding to the S unit virtual assets include data feature vector Ci corresponding to unit virtual asset Ai, and weight model parameters respectively corresponding to the S unit virtual assets include weight model parameter Di corresponding to unit virtual asset Ai, where i is a positive integer less than or equal to S. The computer may determine an association degree between a recognition demand type indicated by the service processing instruction and unit virtual asset Ai, and allocate a data association weight to unit virtual asset Ai according to the association degree. The association degree between the unit virtual asset and the recognition demand type may be obtained by calculating an attention score, a vector similarity, or a Pearson correlation coefficient between the unit virtual asset and the recognition demand type, which is not limited herein. The computer may concatenate data feature vector Ci and weight model parameter Di to obtain a data concatenating feature, and determine a product of the data concatenating feature and the data association weight as a fused feature vector corresponding to unit virtual asset Ai. For a possible concatenating manner, reference may be made to formula (1).

$$F=t*(C_i+D_i) \quad (1)$$

As illustrated in formula (1), F represents a fused feature vector corresponding to unit virtual asset Ai, and t indicates a data association weight corresponding to unit virtual asset Ai.

At S405, a prompt text for indicating a recognition demand type is generated according to the service processing instruction, a target processing network corresponding to the recognition demand type is determined from the target service processing model according to the prompt text, and feature processing is performed on the S fused feature vectors and the prompt text via the target processing network, to obtain a feature processing result. The feature processing result is classified and recognized to obtain a data recognition result for responding to the service processing instruction.

In embodiments of the present disclosure, the computer may generate, according to the service processing instruction, the prompt text for indicating the recognition demand type by using a natural language processing technology. The computer may determine, from the target service processing model, the target processing network corresponding to the recognition demand type according to the prompt text. The target processing network may be a pricing prediction network, for example, when the prompt text is "Predicts a price for XX", or a text associated with predicting a price. In this case, the computer performs feature processing on the S fused feature vectors and the prompt text via the target processing network to obtain the feature processing result as follows. The computer performs feature extraction on the prompt text to obtain a prompt text feature. Specifically, the target service processing model further includes a text coding component, and the computer can perform tokenization on the prompt text with the text coding component to obtain a token sequence corresponding to the prompt text. The computer performs encoding processing on each token in the word sequence corresponding to the prompt text to obtain the prompt text feature. One token in the word sequence refers to a minimum basic unit obtained after tokenization is performed on the prompt text. The text tokenization method may be word-based tokenization, character-based splitting tokenization, and sub-word-based tokenization, which is not limited in embodiments of the present disclosure. Further, the computer may obtain, according to a search engine associated with the pricing prediction network, environmental factor information about an object to be priced indicated by the prompt text. The object to be priced refers to a main object in the prompt text, for example, the prompt text is "predict the lease price of aircraft XS", and the object to be priced is "aircraft XS". The environmental factor information may refer to various relevant factors that contribute to the lease price of aircraft XS that may be retrieved with the search engine. The environmental factor information may include external market environmental factors, popularity of aircraft XS, credit status of tenants of aircraft XS, and current environment-social-governance (ESG) standards, etc. Since the environment factor information may include relevant data such as text, picture, and video, the computer may perform feature extraction on the environment factor information with the multimodal feature extraction component to obtain an environment factor feature. Further, the computer may fuse the environment factor feature, the prompt text feature, and the S fused feature vectors to obtain a feature processing result. Common fusion manners include a vector concatenation manner, a weighted average manner, and the like, which are not limited herein.

Further, the computer classifies and recognizes the feature processing result to obtain the data recognition result for responding to the service processing instruction as follows. The computer may obtain P price range labels corresponding to the pricing prediction network and predicted market information respectively corresponding to the P price range labels, where P is a positive integer. The price range label can be set according to historical pricing data of the object to be priced, and one price range label indicates one price range. The predicted market information indicates various pricing factor data of a corresponding price range. If a certain feature processing result is more relevant to a predicted market information, a predicted price of an object to be priced is more relevant to a price range associated with the predicted market information. The computer can respectively perform feature extraction on the P pieces of predicted market information to obtain P market price features. The computer can perform cross attention processing on the feature processing result and the P market price features to obtain P first cross attention scores. Specifically, the computer may combine the P market price features in a vector concatenating manner to obtain a price combination feature. The computer can use the feature processing result as a query vector in a cross-attention function, use the price combination feature as a key vector in the cross-attention function, and use the price combination feature as a value vector in the cross-attention function. The computer can determine a product of the query vector and the key vector as a first fused feature through the cross-attention function. The computer can obtain a number of dimensions corresponding to the price combination feature, and determine a product of the first fused feature and a reciprocal of the number of dimensions as a second fused feature. The computer can transform the second fused feature into a first activation feature according to an activation subfunction of the cross attention function. The computer can determine a product of the first activation feature and the value vector as an attention processing sequence, where the attention processing sequence includes P first cross attention scores. Reference of one possible cross attention function can be made to formula (2).

$$\text{Attention}(Q, K, V) = \text{softmax}\left(\frac{QK^T}{\sqrt{d_k}}\right)V \qquad (2)$$

As illustrated in formula (2), Attention (Q, K, V) represents a cross attention function, Q represents a query vector, K represents a key vector, V represents a value vector, T represents transpose, $K^T$ represents a transpose matrix of K, and $d_k$ represents the number of dimensions corresponding to the price combination feature, softmax $$\left(\frac{QK^T}{\sqrt{d_k}}\right)$$

represents the first activation feature, softmax $$\left(\frac{QK^T}{\sqrt{d_k}}\right)$$

represents an attention processing sequence.

The computer may determine a price range label corresponding to predicted market information associated with a first target cross attention score as the data recognition result for responding to the service processing instruction. The first target cross attention score is a maximum first cross attention score of the P first cross attention scores. That is, the computer obtains a price range label most associated with the feature processing result from the P price range labels, and determine the price range label as the data recognition result for responding to the service processing instruction.

Optionally, when the prompt text is "analyzing a health condition of a lease combination", "analyzing the operating efficiency of the lease combination", or "analyzing the financial performance of the virtual asset-associated data", etc., and the target processing network determined according to the prompt text is a data analysis network, the computer performs feature processing on the S fused feature vectors and the prompt text via the target processing network to obtain the feature processing result as follows. The computer may perform feature extraction on the prompt text by using a text encoding component to obtain a prompt text feature, and fuse the prompt text feature and the S fused feature vectors by vector concatenating or weighted average to obtain the feature processing result. Further, the computer classifies and recognizes the feature processing result to obtain the data recognition result for responding to the service processing instruction as follows. The computer may obtain Q data classification labels corresponding to the data analysis network and label-associated information respectively corresponding to the Q data classification labels. The data classification labels can be classification labels of "high", "medium", "low", "good", "poor", and the like for analyzing the health condition of the lease combination, analyzing the operating efficiency of the lease combination, or analyzing the financial performance of the virtual asset-associated data. The label-associated information indicates data associated with a corresponding data classification label and to be compared with a unit virtual asset. When a unit virtual asset is more relevant to a label-associated information, the unit virtual asset is more relevant to a data classification label corresponding to the label-associated information.

The computer may respectively perform feature extraction on Q label-associated information to obtain Q data classification features, where Q is a positive integer. The computer may perform cross attention processing on the feature processing result and the Q data classification features to obtain Q second cross attention scores. For a specific implementation process of obtain the Q second cross attention scores, reference may be made to the specific implementation process of obtaining the P first cross attention scores, which will not be repeatedly described herein. The computer may determine a data classification label corresponding to label-associated information associated with a second target cross attention score as the data recognition result for responding to the service processing instruction, where the second target cross attention score is the maximum cross attention score of the Q second cross attention scores. That is, through the cross-attention process, label-associated information most relevant to the unit virtual asset and the prompt text can be obtained.

At S406, data processing is performed on the data recognition result and the prompt text to obtain a service result for the service processing instruction.

In embodiments of the present disclosure, the computer may perform information retrieval on the data recognition result and the prompt text via a large language model (LLM) to obtain an information retrieval result. The large language model is a model obtained through training according to a large amount of text data, and can generate coherent texts and execute multiple language processing tasks. The computer may obtain a template library associated with the target processing network, and obtain a service template corresponding to the prompt text from the template library. When the target processing network is a pricing prediction network, the template library may include a service template for analyzing or recommending a predicted price, so as to ensure, by virtue of final pricing, the maximized revenue and the competitiveness of final pricing. When the target processing network is a data analysis network, the template library may include an insight report template for financial performance, a health condition of a lease combination, and the operating efficiency of the lease combination, or an optimization suggestion template for the lease combination. The computer may determine a text to be updated in the service template, replace the text to be updated in the service template according to the data recognition result and the information retrieval result to obtain an updated service text, and determine the updated service text as a service result for the service processing instruction. For example, the first service object can know the lease performance of a certain lease combination according to the service result, so as to decide whether to change the lease combination, and obtain the determined final lease combination. The lease combination refers to a combination in which several certain aircraft or several components of the aircraft are combined together for lease to obtain an optimal lease price.

Optionally, if the recognition demand type indicated by the prompt text includes a drawing processing demand, the computer may recognize a drawing image type according to the drawing processing demand, and obtain, from an image template library, an image template of the drawing image type. The image template library includes various types of image modules, for example, image templates used for mathematical and statistical analysis, such as a statistical chart, a histogram, and a polygonal chart. The computer may generate a Gaussian noise image according to the image template and initial noise data. The computer may input the data recognition result and the prompt text into a large language model, and fuse and expand the data recognition result and the prompt text via the large language model to obtain a drawing indication text. The computer may input the Gaussian noise image and the drawing indication text into a text-to-image model, and perform feature extraction on the Gaussian noise image via the text-to-image model to obtain a Gaussian noise feature. The computer may obtain a potential variable distribution in a forward diffusion network layer of the text-to-image model. The potential variable distribution is a conceptual distribution with noise being added, and may be, for example, Gaussian distribution. The computer may continuously add a random noise vector to the Gaussian noise feature in T time steps to obtain a forward noise vector. Further, the computer may perform feature coding on the drawing indication text via the text-to-image model to obtain a drawing text feature, and perform denoising processing on the Gaussian noise image according to the forward noise vector and the drawing text feature to obtain a drawing data graph. Optionally, if there is historical reference data associated with the prompt text and data recognition results, for example, when the data recognition result is a predicted price range, historical reference data, such as a historical predicted price or a historical lease price, exists for the object to be priced, the historical reference data can be input into the text-to-image model, and the Gaussian noise image is denoised according to a reference data feature of the historical reference data, a forward noise vector, and a drawing text feature, to obtain a drawing data graph. The computer may determine the data recognition result and the drawing data graph as a service result for the service processing instruction. For example, the first service object may determine a final price of the object to be priced according to the data recognition result and the drawing data graph.

In the described process, by means of the target service processing model, the virtual asset-associated data is classified by using the asset data classification rule, a service type and a component (binary group classification information) to which a unit virtual asset belongs can be obtained, which can achieve data classification without human interference, and then save manpower costs. By fully utilizing weight information (a weight model parameter) about a service type or a component to which a unit virtual asset belongs, and a data association weight between a unit virtual asset and a service processing instruction, important data suitable for the recognition demand type can be better found by means of the weight model parameter and the data association weight, thereby improving an influence ratio of the important data, being able to better deal with a service processing problem in the case of complex data, and improving the recognition accuracy of a final data recognition result. Furthermore, according to the prompt text generated based on the service processing instruction, the target processing network (including a pricing prediction network and a data analysis network, etc.) can be determined from the target service processing model, so as to realize targeted processing on the unit virtual asset, thereby improving the service processing efficiency and saving time. A final service result responding to a service processing instruction is obtained by analyzing and processing the data recognition result, so as to provide a more professional suggestion for the first service object, which can provide the first service object an optimal solution and obtain a corresponding service result without manually analyzing various types of data, thereby saving human costs.

Figure 6:
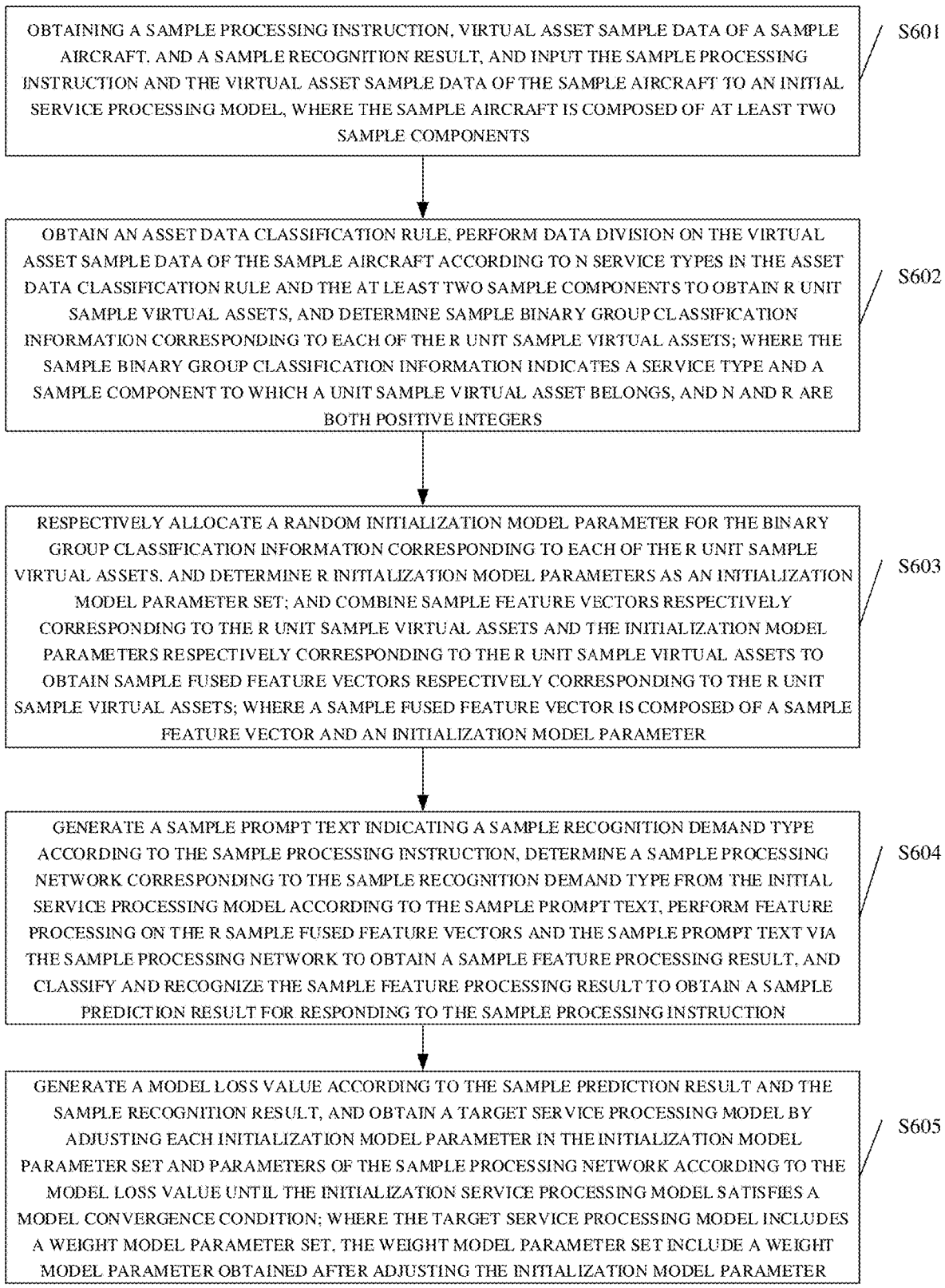
FIG. 6 is a schematic flowchart of a method for data processing provided in yet another embodiment of the present disclosure.

Further, referring to FIG. 6, FIG. 6 is a schematic flowchart of a method for data processing provided in yet another embodiment of the present disclosure. The method for data processing may be performed by a computer, and the computer may be service server 101 or any terminal device in a terminal device cluster illustrated in FIG. 1. For illustrative purpose, the method for data processing is performed by a computer. where the method for data processing may at least include operations at S601-S605.

At S601, a sample processing instruction, virtual asset sample data of a sample aircraft, and a sample recognition result are obtained, and the sample processing instruction and the virtual asset sample data of the sample aircraft are input to an initial service processing model, where the sample aircraft is composed of at least two sample components.

In an embodiment of the present disclosure, the sample aircraft may be the same as the described aircraft, and the virtual asset sample data of the sample aircraft may include all data of the at least two sample components of the sample aircraft under N service types. The sample recognition result is a data result obtained by processing the virtual asset sample data of the sample aircraft according to the sample processing instruction. The sample recognition result is used for data comparison with a sample prediction result obtained by processing the virtual asset sample data of the sample aircraft with the initial service processing model according to the sample processing instruction.

At S602, an asset data classification rule is obtained, data division is performed on the virtual asset sample data of the sample aircraft according to N service types in the asset data classification rule and the at least two sample components to obtain R unit sample virtual assets, and sample binary group classification information corresponding to each of the R unit sample virtual assets is determined; where the sample binary group classification information indicates a service type and a sample component to which a unit sample virtual asset belongs, and N and R are both positive integers.

In embodiments of the present disclosure, for a specific implementation process of at operations at S602, reference may be made to the related description of operations at S402 illustrated in FIG. 4, and which will not be repeatedly described in detail herein.

At S603, a random initialization model parameter is allocated for the binary group classification information corresponding to each of the R unit sample virtual assets, and R initialization model parameters are determined as an initialization model parameter set. Sample feature vectors respectively corresponding to the R unit sample virtual assets and the initialization model parameters respectively corresponding to the R unit sample virtual assets are combined to obtain sample fused feature vectors respectively corresponding to the R unit sample virtual assets; where a sample fused feature vector is composed of a sample feature vector and an initialization model parameter.

In embodiments of the present disclosure, the computer may randomly generate R initialization vectors, determine the R initialization vectors as initialization model parameters, respectively allocate random initialization model parameters for binary group classification information corresponding to the R unit sample virtual assets, and may determine the R initialization model parameters as the initialization model parameter set. The computer may determine a sample association between each of the R unit sample virtual assets and a sample recognition demand type indicated by the sample processing instruction. The computer may allocate different sample association weights to the R unit sample virtual assets according to sample association degrees. The computer further combines sample feature vectors respectively corresponding to the R unit sample virtual assets, sample association weights respectively corresponding to the R unit sample virtual assets, and initialization model parameters respectively corresponding to the R unit sample virtual assets to obtain sample fused feature vectors respectively corresponding to R unit sample virtual assets. One sample fused feature vector is composed of one sample feature vector, one sample association weight, and one initialization model parameter.

At S604, a sample prompt text indicating a sample recognition demand type is generated according to the sample processing instruction, a sample processing network corresponding to the sample recognition demand type is determined from the initial service processing model according to the sample prompt text, feature processing is performed on the R sample fused feature vectors and the sample prompt text via the sample processing network to obtain a sample feature processing result, and the sample feature processing result is classified and recognized to obtain a sample prediction result for responding to the sample processing instruction.

In embodiments of the present disclosure, the computer may invoke a natural language processing component to analyze the sample processing instruction with the natural language processing component, to obtain the sample prompt text for indicating the sample recognition demand type. Further, the computer may determine, from the initial service processing model, the sample processing network corresponding to the sample recognition demand type according to the sample prompt text. It can be understood that the initial service processing model includes multiple initial processing networks, and the computer may select a required initial processing network from the multiple initial processing networks as the sample processing network according to the sample recognition demand type, and perform feature processing on the R sample fused feature vectors and sample prompt text via the sample processing network to obtain the sample feature processing result.

Further, the computer may further classify and recognize the sample feature processing result may be classified and identified to obtain the sample prediction result for responding to the sample processing instruction.

At S605, a model loss value is generated according to the sample prediction result and the sample recognition result, and a target service processing model is obtained by adjusting each initialization model parameter in the initialization model parameter set and parameters of the sample processing network according to the model loss value until the initialization service processing model satisfies a model convergence condition. The target service processing model includes a weight model parameter set, the weight model parameter set includes a weight model parameter obtained after adjusting the initialization model parameter.

In embodiments of the present disclosure, the computer can generate the model loss value according to the sample prediction result and the sample recognition result. For a possible method of generating the model loss value, reference may be made to formula (3).

$$\text{Cosine Loss} = \frac{1}{2}(1 - \text{cosine\_similarity}) \quad (3)$$

As illustrated in formula (3), Cosine Loss represents a cosine similarity loss value (i. e. a model loss value) between a sample prediction result and a sample recognition result, and cosine_similarity represents a cosine similarity between the sample prediction result and the sample recognition result. For a possible cosine similarity calculation formula, reference may be made to formula (4).

$$\text{cosine\_similarity}(A, B) = \frac{A \cdot B}{\|A\|\|B\|} \quad (4)$$

As illustrated in formula (4), cosine_similarity (A, B) represents a cosine similarity between vector A and vector B. In other words, the computer can perform vectorization processing on the sample prediction result to obtain vector A, perform vectorization processing on the sample recognition result to obtain vector B, and calculate the cosine similarity between vector A and vector B. "·" represents a dot product between vector A and vector B, $\|A\|$ denotes a module length of vector A, and $\|B\|$ denotes a module length of vector B.

Further, the computer may adjust each initialization model parameter in the initialization model parameter set and the parameters of the sample processing network according to the model loss value until the parameters converge. It is to be noted that the sample data for parameter adjustment of the initial service processing model includes multiple batches of sample processing instructions, and multiple batches of sample processing instructions and sample recognition results corresponding to the virtual asset sample data of the sample aircraft. A batch of sample processing instructions may correspond to one initial processing network among the multiple initial processing networks in the initial service processing model. The computer may adjust, according to the model loss value of each batch, initialization model parameters in the initialization model parameter set and the sample processing network corresponding to each batch, until the initial service processing model meets the model convergence condition, so as to obtain the target service processing model. The target service processing model includes a weight model parameter set, and the weight model parameter set includes a weight model parameter obtained after adjusting an initialization model parameter.

In the described process, on the basis of a policy for performing parameter adjustment according to both the sample prediction result output by the initial service processing model and the sample recognition result, the weight model parameter set is obtained, which can enable the weight model parameter to learn a demand relationship between the sample processing instruction and the sample binary group classification information about the virtual asset sample data, i.e. the degree of importance of important data for dealing the sample processing instruction in virtual asset sample data. In this way, when the target service processing model processes the service processing instruction and the relevant data, the service processing instruction and the relevant data are combined fully with and the weight model parameter of the relevant data, so that the influence ratio of important data for dealing with the service processing instruction in relevant data is increased, thereby improving the accuracy and stability of service processing.

Figure 7:
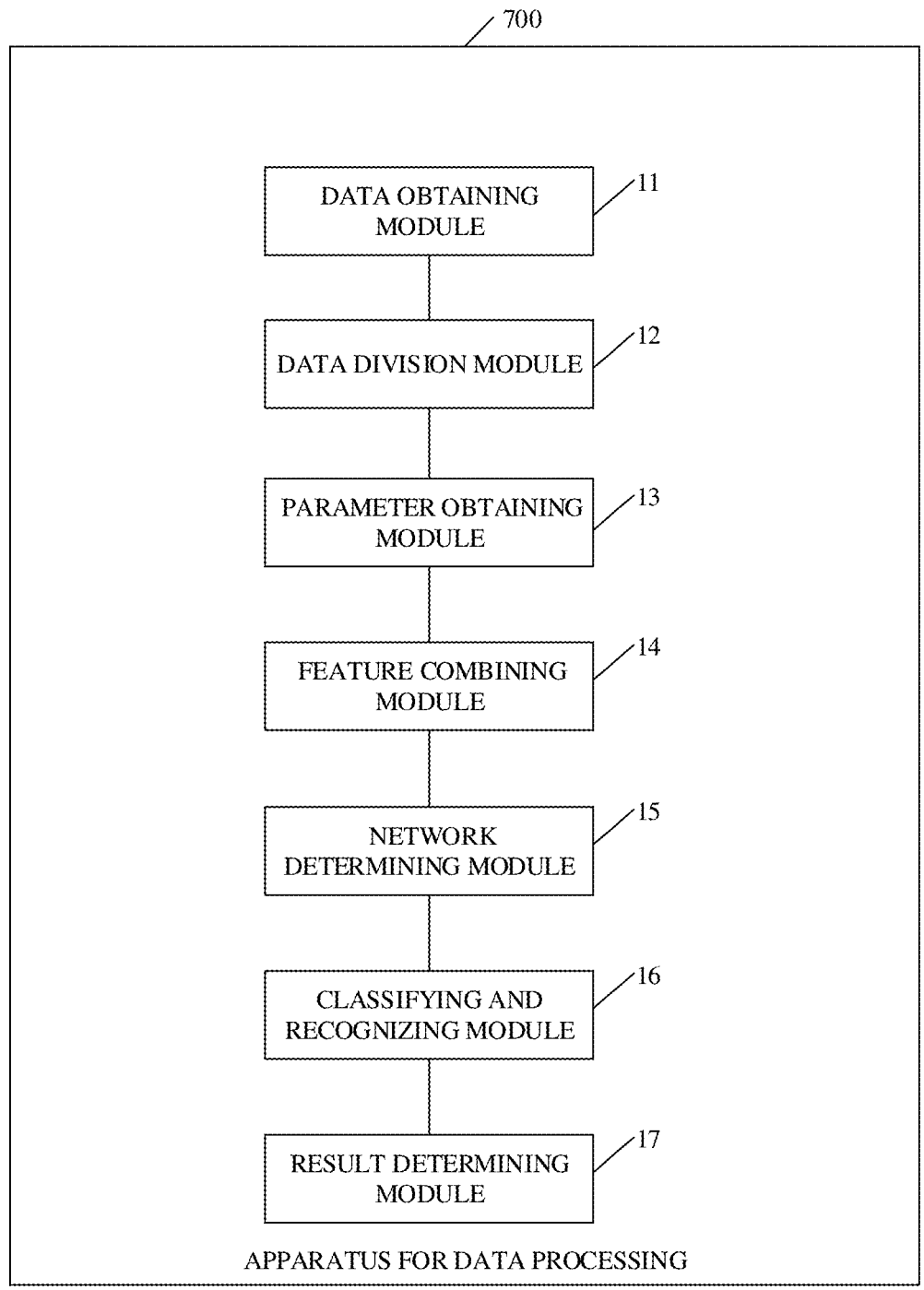
FIG. 7 is a schematic diagram of an apparatus for data processing provided in an embodiment of the present disclosure.

Further, please refer to FIG. 7, which is a schematic diagram of an apparatus for data processing provided in an embodiment of the present disclosure. The apparatus 700 for data processing can be a computer program (including program codes, etc.) running on a computer, for example, the apparatus 700 for data processing can be an application software. The apparatus 700 for data processing can be configured to perform corresponding operations of the method provided in embodiments of the present disclosure. As illustrated in FIG. 7, the apparatus 700 for data processing can be applicable to the computer in the embodiments corresponding to FIGS. 3, 4, and 6. Specifically, the apparatus 700 for data processing can include a data obtaining module 11, a data division module 12, a parameter obtaining module 13, a feature combining module 14, a network determining module 15, and a classifying and recognizing module 16, and a result determining module 17.

The data obtaining module 11 is configured to obtain a service processing instruction and virtual asset-associated data of an aircraft sent by a first service object, and input the service processing instruction and the virtual asset-associated data of the aircraft to a target service processing model; where the aircraft is composed of at least two components.

The data division module 12 is configured to obtain an asset data classification rule, perform data division on the virtual asset-associated data of the aircraft according to N service types in the asset data classification rule and the at least two components to obtain S unit virtual assets, and determine binary group classification information corresponding to each of the S unit virtual assets; where the binary group classification information indicates a service type and a component to which a unit virtual asset belongs, and N and S are both positive integers.

The parameter obtaining module 13 is configured to obtain weight model parameters respectively corresponding to the S unit virtual assets from a weight model parameter set in the target service processing model according to binary group classification information respectively corresponding to the S unit virtual assets; where the weight model parameter set includes H weight model parameters respectively representing different influence weights, each weight model parameter corresponds to one piece of binary group classification information, and His a positive integer.

The feature combining module 14 is configured to combine data feature vectors respectively corresponding to the S unit virtual assets with the weight model parameters respectively corresponding to the S unit virtual assets to obtain fused feature vectors respectively corresponding to the S unit virtual assets; where a fused feature vector is composed of a data feature vector and a weight model parameter.

The network determining module 15 is configured to generate a prompt text for indicating a recognition demand type according to the service processing instruction, determine a target processing network corresponding to the recognition demand type from the target service processing model according to the prompt text, and perform feature processing on the S fused feature vectors and the prompt text via the target processing network, to obtain a feature processing result.

The classifying and recognizing module 16 is configured to classify and recognize the feature processing result to obtain a data recognition result for responding to the service processing instruction.

In one possible embodiment, in terms of performing data division on the virtual asset-associated data of the aircraft according to the N service types in the asset data classification rule and the at least two components to obtain the S unit virtual assets, and determining binary group classification information corresponding to each of the S unit virtual assets, the data division module 12 is configured to: classify the virtual asset-associated data of the aircraft according to the N service types in the asset data classification rule to obtain M types of classified data; where service types respectively corresponding to the M types of classified data belong to the N service types, M is a positive integer less than or equal to N; in each type of classified data, perform component division on each type of classified data according to the at least two components, to obtain the S unit virtual assets; where one unit virtual asset corresponds to one service type and one component; obtain service types and components respectively corresponding to the S unit virtual assets, and combine the service types and the components respectively corresponding to the S unit virtual assets to obtain binary group classification information respectively corresponding to the S unit virtual assets.

In one possible embodiment, the N service types include an asset service data type, a basic service data type, and a transaction service data type; and in response to M being equal to N, the M types of classified data include first classified data, second classified data and third classified data. In terms of classifying the virtual asset-associated data of the aircraft according to the N service types in the asset data classification rule to obtain the M types of classified data, the data division module 12 is configured to: obtain a data key field corresponding to the asset service data type, where the data key field includes a usage record key field, a maintenance record key field and a depreciation record key field; obtain, from the virtual asset-associated data of the aircraft, a historical usage record corresponding to the usage record key field, a historical maintenance record corresponding to the maintenance record key field, and a historical depreciation record corresponding to the depreciation record key field, and determine the historical usage record, the historical maintenance record, and the historical depreciation record as the first classified data corresponding to the asset service data type; obtain a factory key field corresponding to the basic service data type, obtain, from the virtual asset-associated data of the aircraft, factory-associated data corresponding to the factory key field, and determine the factory-associated data as the second classified data corresponding to the basic service data type; and obtain a transaction key field corresponding to the transaction service data type, obtain, from the virtual asset-associated data of the aircraft, transaction-associated data corresponding to the transaction key field, and determine the transaction-associated data as the third classified data corresponding to the transaction service data type.

In one possible embodiment, the binary group classification information respectively corresponding to the S units of virtual assets includes binary group classification information Bi, where i is a positive integer less than or equal to S. In terms of obtaining the weight model parameters respectively corresponding to the S unit virtual assets from the weight model parameter set in the target service processing model according to the binary group classification information respectively corresponding to the S unit virtual assets, the parameter obtaining module 13 is configured to: obtain the weight model parameter set and a parameter matching rule in the target service processing model, where the parameter matching rule indicates a mapping relationship between weight model parameters in the weight model parameter set and binary group classification information; determine a binary group classification information set according to the weight model parameter set and the parameter matching rule; determine binary group classification information in the binary group classification information set that matches binary group classification information Bi as target binary group classification information; and obtain, from the weight model parameter, a target weight model parameter corresponding to the target binary group classification information according to the target binary group classification information and the parameter matching rule, and determine the target weight model parameter as a weight model parameter corresponding to binary group classification information Bi.

In one possible embodiment, the S unit virtual assets include unit virtual asset Ai, the data feature vectors respectively corresponding to the S unit virtual assets include data feature vector Ci corresponding to unit virtual asset Ai, the weight model parameters respectively corresponding to the S unit virtual assets include weight model parameter Di corresponding to unit virtual asset Ai, i is a positive integer less than or equal to S. in terms of combining the data feature vectors respectively corresponding to the S unit virtual assets with the weight model parameters respectively corresponding to the S unit virtual assets to obtain the fused feature vectors respectively corresponding to the S unit virtual assets, the feature combining module 14 is configured to: determine an association degree between a recognition demand type indicated by the service processing instruction and unit virtual asset Ai, and allocate a data association weight to unit virtual asset Ai according to the association degree; and concatenate data feature vector Ci and weight model parameter Di to obtain a data concatenating feature, and determine a product of the data concatenating feature and the data association weight as a fused feature vector corresponding to unit virtual asset Ai.

In one possible embodiment, the target processing network is a pricing prediction network. In terms of performing feature processing on the S fused feature vectors and the prompt text via the target processing network to obtain the feature processing result, the network determining module 15 is configured to: perform feature extraction on the prompt text to obtain a prompt text feature; obtain environmental factor information about an object to be priced indicated by the prompt text, according to a search engine associated with the pricing prediction network; and perform feature extraction on the environment factor information to obtain an environment factor feature, and fuse the environment factor feature, the prompt text feature, and the S fused feature vectors to obtain the feature processing result. In terms of classifying and recognizing the feature processing result to obtain the data recognition result for responding to the service processing instruction, the classifying and recognizing module 16 is configured to: obtain P price range labels corresponding to the pricing prediction network and predicted market information respectively corresponding to the P price range labels, and respectively perform feature extraction on the P pieces of predicted market information to obtain P market price features; where P is a positive integer; perform cross attention processing on the feature processing result and the P market price features to obtain P first cross attention scores; determine a price range label corresponding to predicted market information associated with a first target cross attention score as the data recognition result for responding to the service processing instruction, where the first target cross attention score is a maximum first cross attention score of the P first cross attention scores.

In one possible embodiment, in terms of performing cross attention processing on the feature processing result and the P market price features to obtain the P first cross attention scores, the classifying and recognizing module 16 is configured to: combine the P market price features to obtain a price combination feature; use the feature processing result as a query vector in a cross-attention function, use the price combination feature as a key vector in the cross-attention function, and use the price combination feature as a value vector in the cross-attention function; determine a product of the query vector and the key vector as a first fused feature through the cross-attention function; obtain a number of dimensions corresponding to the price combination feature, and determine a product of the first fused feature and a reciprocal of the number of dimensions as a second fused feature; transform the second fused feature into a first activation feature according to an activation subfunction of the cross attention function; and determine a product of the first activation feature and the value vector as an attention processing sequence, where the attention processing sequence includes P first cross attention scores.

In one possible embodiment, the target processing network is a data analysis network. In terms of performing feature processing on the S fused feature vectors and the prompt text via the target processing network to obtain the feature processing result, the network determining module 15 is configured to: perform feature extraction on the prompt text to obtain a prompt text feature; and fuse the prompt text feature and the S fused feature vectors to obtain the feature processing result. In terms of classifying and recognizing the feature processing result to obtain the data recognition result for responding to the service processing instruction, the classifying and recognizing module 16 is configured to: obtain Q data classification labels corresponding to the data analysis network and label-associated information respectively corresponding to the Q data classification labels, and respectively perform feature extraction on the Q label-associated information to obtain Q data classification features, where Q is a positive integer; perform cross attention processing on the feature processing result and the Q data classification features to obtain Q second cross attention scores; and determine a data classification label corresponding to label-associated information associated with a second target cross attention score as the data recognition result for responding to the service processing instruction, where the second target cross attention score is the maximum cross attention score of the Q second cross attention scores.

In one possible embodiment, the apparatus 700 for data processing further includes a result determining module 17. The result determining module 17 is configured to: perform information retrieval on the data recognition result and the prompt text via a large language model to obtain an information retrieval result; obtain a template library associated with the target processing network, and obtain, from the template library, a service template corresponding to the prompt text; and determining a text to be updated in the service template, replace the text to be updated in the service template according to the data recognition result and the information retrieval result to obtain an updated service text, and determine the updated service text as a service result for the service processing instruction.

In one possible embodiment, the result determining module 17 is further configured to: in response to the recognition demand type indicated by the prompt text including a drawing processing demand, recognize a drawing image type according to the drawing processing demand, obtain, from an image template library, an image template of the drawing image type, and generate a Gaussian noise image according to the image template and initial noise data; input the data recognition result and the prompt text into a large language model, and fuse and expand the data recognition result and the prompt text via the large language model to obtain a drawing indication text; input the Gaussian noise image and the drawing indication text into a text-to-image model, perform feature extraction on the Gaussian noise image via the text-to-image model to obtain a Gaussian noise feature, and perform forward diffusion processing on the Gaussian noise feature to obtain a forward noise vector; perform feature coding on the drawing indication text via the text-to-image model to obtain a drawing text feature, and perform denoising processing on the Gaussian noise image according to the forward noise vector and the drawing text feature to obtain a drawing data graph; and determine the data recognition result and the drawing data graph as a service result for the service processing instruction.

Figure 8:
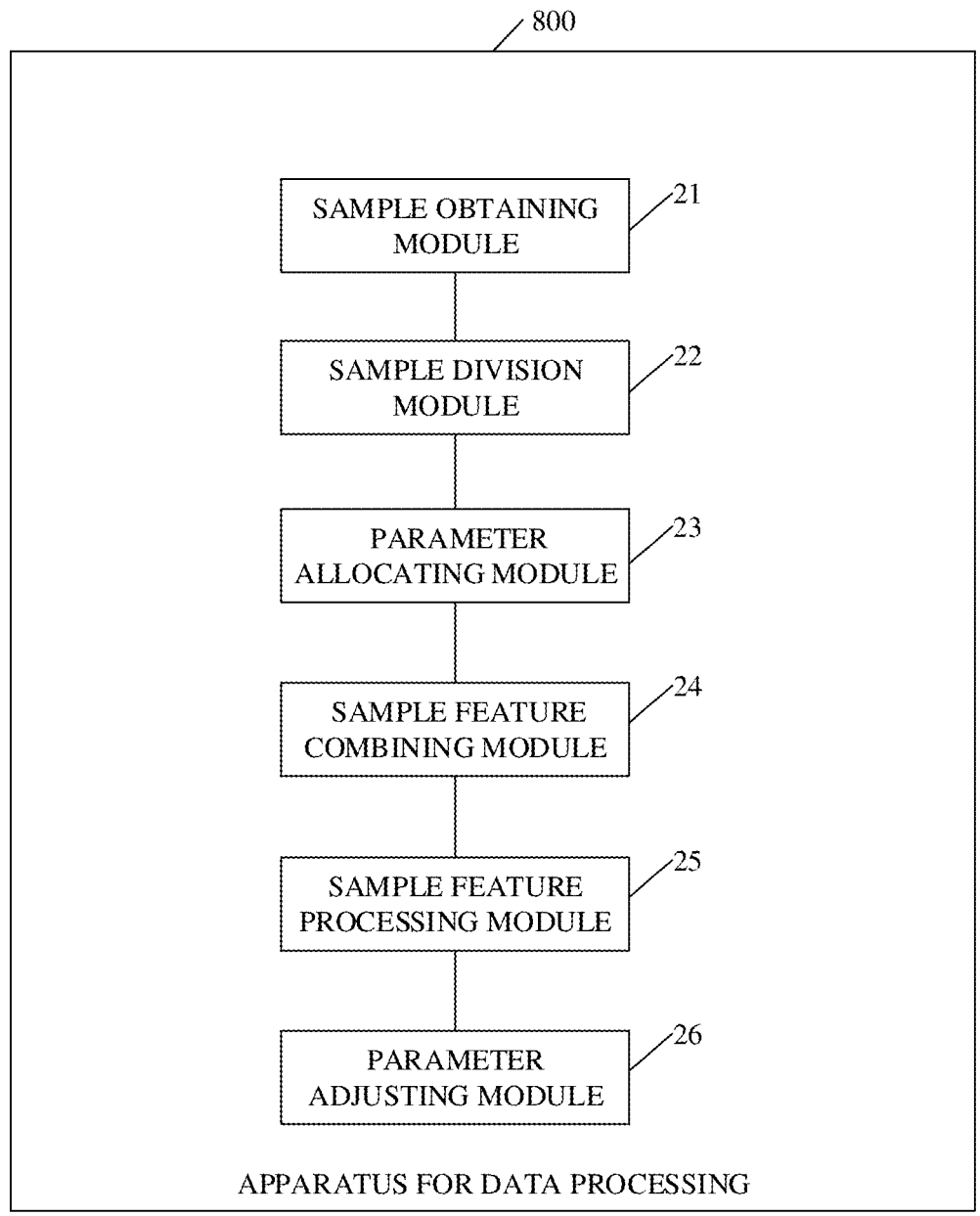
FIG. 8 is a schematic diagram of an apparatus for data processing provided in another embodiment of the present disclosure.

Further, please refer to FIG. 8, which is a schematic diagram of an apparatus for data processing provided in another embodiment of the present disclosure. The apparatus 800 for data processing can be a computer program (including program codes, etc.) running on a computer, for example, the apparatus 800 for data processing can be an application software. The apparatus 800 for data processing can be configured to perform corresponding operations of the method provided in embodiments of the present disclosure. As illustrated in FIG. 8, the apparatus 800 for data processing can be applicable to the computer in the embodiments corresponding to FIGS. 3, 4, and 6. Specifically, the apparatus 800 for data processing can include a sample obtaining module 21, a sample division module 22, a parameter allocating module 23, a sample feature combining module 24, a sample feature processing module 25, and a parameter adjusting module 26.

The sample obtaining module 21 is configured to obtain a sample processing instruction, virtual asset sample data of a sample aircraft, and a sample recognition result, and input the sample processing instruction and the virtual asset sample data of the sample aircraft to an initial service processing model, where the sample aircraft is composed of at least two sample components.

The sample division module 22 is configured to obtain an asset data classification rule, perform data division on the virtual asset sample data of the sample aircraft according to N service types in the asset data classification rule and the at least two sample components to obtain R unit sample virtual assets, and determine sample binary group classification information corresponding to each of the R unit sample virtual assets; where the sample binary group classification information indicates a service type and a sample component to which a unit sample virtual asset belongs, and N and R are both positive integers.

The parameter allocating module 23 is configured to respectively allocate a random initialization model parameter for the binary group classification information corresponding to each of the R unit sample virtual assets, and determine R initialization model parameters as an initialization model parameter set.

The sample feature combining module 24 is configured to combine sample feature vectors respectively corresponding to the R unit sample virtual assets and the initialization model parameters respectively corresponding to the R unit sample virtual assets to obtain sample fused feature vectors respectively corresponding to the R unit sample virtual assets; where a sample fused feature vector is composed of a sample feature vector and an initialization model parameter.

The sample feature processing module 25 is configured to generate a sample prompt text indicating a sample recognition demand type according to the sample processing instruction, determine a sample processing network corresponding to the sample recognition demand type from the initial service processing model according to the sample prompt text, perform feature processing on the R sample fused feature vectors and the sample prompt text via the sample processing network to obtain a sample feature processing result, and classify and recognize the sample feature processing result to obtain a sample prediction result for responding to the sample processing instruction.

The parameter adjusting module 26 is configured to generate a model loss value according to the sample prediction result and the sample recognition result, and obtain a target service processing model by adjusting each initialization model parameter in the initialization model parameter set and parameters of the sample processing network according to the model loss value until the initialization service processing model satisfies a model convergence condition; where the target service processing model includes a weight model parameter set, the weight model parameter set includes a weight model parameter obtained after adjusting the initialization model parameter.

Figure 9:
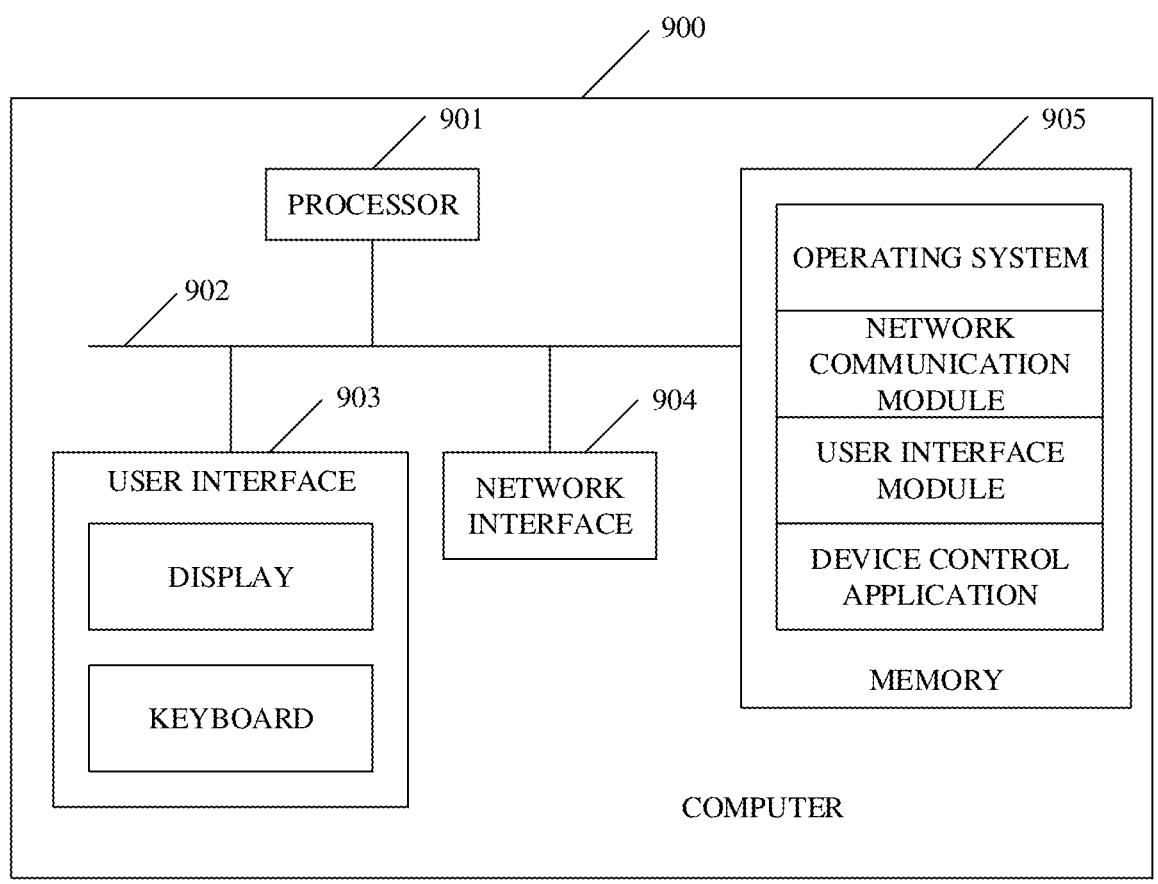
FIG. 9 is a schematic structural diagram of a computer provided in an embodiment of the present disclosure.

Please refer to FIG. 9, which is a schematic structural diagram of a computer provided in an embodiment of the present disclosure. As illustrated in FIG. 9, the computer 900 in this embodiment includes a processor 901, a network interface 904, and a memory 905. Additionally, the computer 900 can further include a user interface 903 and at least one communication bus 902. The communication bus 902 is configured to facilitate connection and communication among these components. The user interface 903 can include a display, a keyboard, and optionally, can also include standard wired interfaces and wireless interface. The network interface 904 can optionally include standard wired interface, and wireless interface, such as a WI-FI interface. The memory 905 can be a high-speed random-access memory (RAM) or non-volatile memory, such as at least one disk storage. Optionally, the memory 905 can also be at least one storage device located remotely from the processor 901. As illustrated in FIG. 9, the memory 905, serving as a computer-readable storage medium, may contain an operating system, a network communication module, a user interface module, and a device control application.

A service processing instruction and virtual asset-associated data of an aircraft sent by a first service object are obtained, the service processing instruction and the virtual asset-associated data of the aircraft are input to a target service processing model, where the aircraft is composed of at least two components. An asset data classification rule is obtained, data division is performed on the virtual asset-associated data of the aircraft according to N service types in the asset data classification rule and the at least two components to obtain S unit virtual assets, and binary group classification information corresponding to each of the S unit virtual assets is determined, where the binary group classification information indicates a service type and a component to which a unit virtual asset belongs, and N and S are both positive integers. Weight model parameters respectively corresponding to the S unit virtual assets are obtained from a weight model parameter set in the target service processing model according to binary group classification information respectively corresponding to the S unit virtual assets, where the weight model parameter set includes H weight model parameters respectively representing different influence weights, each weight model parameter corresponds to one piece of binary group classification information, and H is a positive integer. Data feature vectors respectively corresponding to the S unit virtual assets are combined with the weight model parameters respectively corresponding to the S unit virtual assets to obtain fused feature vectors respectively corresponding to the S unit virtual assets; where a fused feature vector is composed of a data feature vector and a weight model parameter. A prompt text for indicating a recognition demand type is generated according to the service processing instruction, a target processing network corresponding to the recognition demand type is determined from the target service processing model according to the prompt text, and feature processing is performed on the S fused feature vectors and the prompt text via the target processing network, to obtain a feature processing result. The feature processing result is classified and recognized to obtain a data recognition result for responding to the service processing instruction.

In a possible embodiment, the processor is further configured to perform the following operations. A sample processing instruction, virtual asset sample data of a sample aircraft, and a sample recognition result are obtained, and the sample processing instruction and the virtual asset sample data of the sample aircraft are input to an initial service processing model, where the sample aircraft is composed of at least two sample components. An asset data classification rule is obtained, data division is performed on the virtual asset sample data of the sample aircraft according to N service types in the asset data classification rule and the at least two sample components to obtain R unit sample virtual assets, and sample binary group classification information corresponding to each of the R unit sample virtual assets is determined; where the sample binary group classification information indicates a service type and a sample component to which a unit sample virtual asset belongs, and N and R are both positive integers. A random initialization model parameter is allocated for the binary group classification information corresponding to each of the R unit sample virtual assets, and R initialization model parameters are determined as an initialization model parameter set. Sample feature vectors respectively corresponding to the R unit sample virtual assets and the initialization model parameters respectively corresponding to the R unit sample virtual assets are combined to obtain sample fused feature vectors respectively corresponding to the R unit sample virtual assets; where a sample fused feature vector is composed of a sample feature vector and an initialization model parameter. A sample prompt text indicating a sample recognition demand type is generated according to the sample processing instruction, a sample processing network corresponding to the sample recognition demand type is determined from the initial service processing model according to the sample prompt text, feature processing is performed on the R sample fused feature vectors and the sample prompt text via the sample processing network to obtain a sample feature processing result, and the sample feature processing result is classified and recognized to obtain a sample prediction result for responding to the sample processing instruction. A model loss value is generated according to the sample prediction result and the sample recognition result, and a target service processing model is obtained by adjusting each initialization model parameter in the initialization model parameter set and parameters of the sample processing network according to the model loss value until the initialization service processing model satisfies a model convergence condition; where the target service processing model includes a weight model parameter set, the weight model parameter set includes a weight model parameter obtained after adjusting the initialization model parameter.

In addition, it needs to be noted that, a computer-readable storage medium is provided in embodiments of the disclosure. The computer-readable storage medium is configured to store the computer programs executed by the computer device 1000 used for data processing described above. The computer programs are used to be loaded by the processor to execute the method provided in FIGS. 3, 4, and 6, reference of which can be made to implementations of operations provided in FIGS. 3, 4, and 6, and details will not be repeated herein. In addition, beneficial effects of using the same method will not be repeated herein in detail. For technical details of the computer-readable storage medium embodiments in the disclosure that are not disclosed, reference may be made to the description of the method embodiments of the disclosure. As an example, the computer program can be deployed to be executed on one computer, or on multiple computers located at one site, or on multiple computers distributed across multiple sites and interconnected through a communication network.

The computer-readable storage medium may be an internal storage unit of the apparatus provided in any of the foregoing embodiments or the above computer, such as a hard disk or a memory of the computer. The computer-readable storage medium may also be an external storage device of the computer, such as a plug-in hard disk, a smart media card (SMC), a secure digital (SD) card, a flash card, and the like that the computer device is provided with. In addition, the computer-readable storage medium may also include both the internal storage unit of the computer and the external storage device of the computer. The computer-readable storage medium is configured to store computer programs and other programs and data required by the computer. The computer-readable storage medium can be further configured to temporarily store data that has been or is to be outputted.

A computer program product or a computer program is provided in embodiments of the disclosure. The computer program product or the computer program includes computer instructions stored in a computer-readable storage medium. A processor of a computer is configured to read the computer instructions from the computer-readable storage medium. The computer instructions, when executed by the processor, cause the processor to perform the method provided in various possible embodiments illustrated in FIGS. 3, 4, and 6.

The terms "first", "second", and the like used in the specification, the claims, and the accompany drawings in embodiments of the disclosure are used to distinguish different objects rather than describe a particular order. The terms "include" and variations thereof are intended to cover non-exclusive inclusion. For example, a process, method, apparatus, product, or device including a series of steps or units is not limited to the listed steps or modules, on the contrary, it can optionally include other steps or modules that are not listed; alternatively, other steps or units inherent to the process, method, apparatus, product, or device can be included either.

In embodiments of the present disclosure, the term "module" refers to a part of computer programs or computer programs having a predetermined function and working together with other related parts to achieve a predetermined goal. The module may be implemented in whole or in part by using software, hardware (for example, a processing circuit or a memory), or a combination thereof. Also, a processor (or multiple processors or memories) may be used to implement one or more modules or units. Furthermore, each module or unit may be part of an integral module or unit that has the functions of that module or unit.

Those of ordinary skill in the art will appreciate that in combination with the examples described in the embodiments disclosed in this specification, units and algorithm steps can be implemented by electronic hardware, computer software, or by a combination of computer software and electronic hardware. In order to describe interchangeability between hardware and software, the contents and steps of each embodiment have been generally described according to functions in the above description. Whether these functions are performed by hardware or software depends on specific application of the technical solutions and design constraints of technical solutions. Those skilled in the art may use different methods for various particular applications to implement the described functionality, but such methods should not be regarded as going beyond the scope of the disclosure.

The method and related apparatus provided in embodiments of the disclosure is described herein with reference to method flowcharts and/or structural diagrams provided in embodiments of the disclosure. Specifically, each flow and/or block in the method flowchart and/or structural diagram, and a combination of flow and/or block in the flowchart and/or block diagram can be implemented by computer program instructions. These computer program instructions may be provided to a general purpose computer, a special purpose computer, an embedded processor or a processor of other programmable apparatuses to form a machine, such that devices for implementing functions specified by one or more flows in the flowchart and/or one or more blocks in the structural diagram may be generated by executing the instructions with the processor of the computer or other programmable apparatuses. The computer program instructions may also be stored in a computer-readable memory that can direct the computer or other programmable data processing apparatuses to operate in a given manner, so that the instructions stored in the computer-readable memory produce a manufactured article including an instruction device, or the instructions stored in the computer-readable memory may be transmitted through the computer-readable storage medium. Computer instructions may be transmitted from one website, computer, server, or data center to another website, computer, server, or data center in a wired manner (e. g., coaxial cable, fiber optic, digital subscriber line (DSL)), or a wireless manner (e. g., infrared, wireless, microwave, etc.). The instruction device implements the functions specified by one or more flows in the flowchart and/or one or more blocks in the structural diagram. The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flowchart and/or one or more blocks in the structural diagram.

In the methods provided in embodiments of the present disclosure, the steps can be adjusted, merged, and deleted as needed.

In the apparatuses provided in embodiments of the present disclosure, the modules can be merged, divided, and deleted as needed.

The foregoing embodiments are merely some embodiments of the disclosure. The protection scope of the disclosure is not limited thereto. Those skilled in the art can easily think of variations or substitutions within the technical scope disclosed in the disclosure, and these variations or substitutions shall be fall in the scope of protection of the disclosure.

What is claimed is:

1. A method for data processing, comprising:
    obtaining a service processing instruction and virtual asset-associated data of an aircraft sent by a first service object, and inputting the service processing instruction and the virtual asset-associated data of the aircraft to a target service processing model; wherein the aircraft is composed of at least two components;
    obtaining an asset data classification rule, performing data division on the virtual asset-associated data of the aircraft according to N service types in the asset data classification rule and the at least two components to obtain S unit virtual assets, and determining binary group classification information corresponding to each of the S unit virtual assets; wherein the binary group classification information indicates a service type and a component to which a unit virtual asset belongs, and N and S are both positive integers;
    obtaining weight model parameters respectively corresponding to the S unit virtual assets from a weight model parameter set in the target service processing model according to binary group classification information respectively corresponding to the S unit virtual assets; wherein the weight model parameter set comprises H weight model parameters respectively representing different influence weights, each weight model parameter corresponds to one piece of binary group classification information, and H is a positive integer;
    combining data feature vectors respectively corresponding to the S unit virtual assets with the weight model parameters respectively corresponding to the S unit virtual assets to obtain fused feature vectors respectively corresponding to the S unit virtual assets; wherein a fused feature vector is composed of a data feature vector and a weight model parameter;
    generating a prompt text for indicating a recognition demand type according to the service processing instruction, determining a target processing network corresponding to the recognition demand type from the target service processing model according to the prompt text, and performing feature processing on the S fused feature vectors and the prompt text via the target processing network, to obtain a feature processing result;
    classifying and recognizing the feature processing result to obtain a data recognition result for responding to the service processing instruction.

2. The method of claim 1, wherein performing data division on the virtual asset-associated data of the aircraft according to the N service types in the asset data classification rule and the at least two components to obtain the S unit virtual assets, and determining binary group classification information corresponding to each of the S unit virtual assets comprises:
    classifying the virtual asset-associated data of the aircraft according to the N service types in the asset data classification rule to obtain M types of classified data; wherein service types respectively corresponding to the M types of classified data belong to the N service types, M is a positive integer less than or equal to N;
    in each type of classified data, performing component division on each type of classified data according to the at least two components, to obtain the S unit virtual assets; wherein one unit virtual asset corresponds to one service type and one component;
    obtaining service types and components respectively corresponding to the S unit virtual assets, and combining the service types and the components respectively corresponding to the S unit virtual assets to obtain binary group classification information respectively corresponding to the S unit virtual assets.

3. The method of claim 2, wherein the N service types comprise an asset service data type, a basic service data type, and a transaction service data type; and in response to M being equal to N, the M types of classified data comprise first classified data, second classified data and third classified data; wherein classifying the virtual asset-associated data of the aircraft according to the N service types in the asset data classification rule to obtain the M types of classified data, comprises:
    obtaining a data key field corresponding to the asset service data type, wherein the data key field comprises a usage record key field, a maintenance record key field, and a depreciation record key field;
    obtaining, from the virtual asset-associated data of the aircraft, a historical usage record corresponding to the usage record key field, a historical maintenance record corresponding to the maintenance record key field, and a historical depreciation record corresponding to the depreciation record key field, and determining the historical usage record, the historical maintenance record, and the historical depreciation record as the first classified data corresponding to the asset service data type;
    obtaining a factory key field corresponding to the basic service data type, obtaining, from the virtual asset-associated data of the aircraft, factory-associated data corresponding to the factory key field, and determining the factory-associated data as the second classified data corresponding to the basic service data type; and
    obtaining a transaction key field corresponding to the transaction service data type, obtaining, from the virtual asset-associated data of the aircraft, transaction-associated data corresponding to the transaction key field, and determining the transaction-associated data as the third classified data corresponding to the transaction service data type.

4. The method of claim 1, wherein the binary group classification information respectively corresponding to the S units of virtual assets comprises binary group classification information Bi, wherein i is a positive integer less than or equal to S; obtaining the weight model parameters respectively corresponding to the S unit virtual assets from the weight model parameter set in the target service processing model according to the binary group classification information respectively corresponding to the S unit virtual assets comprises:
  obtaining the weight model parameter set and a parameter matching rule in the target service processing model, wherein the parameter matching rule indicates a mapping relationship between weight model parameters in the weight model parameter set and binary group classification information;
  determining a binary group classification information set according to the weight model parameter set and the parameter matching rule;
  determining binary group classification information in the binary group classification information set that matches binary group classification information Bi as target binary group classification information; and
  obtaining, from the weight model parameter, a target weight model parameter corresponding to the target binary group classification information according to the target binary group classification information and the parameter matching rule, and determining the target weight model parameter as a weight model parameter corresponding to binary group classification information Bi.

5. The method of claim 1, wherein the S unit virtual assets comprise unit virtual asset Ai, the data feature vectors respectively corresponding to the S unit virtual assets comprise data feature vector Ci corresponding to unit virtual asset Ai, the weight model parameters respectively corresponding to the S unit virtual assets comprise weight model parameter Di corresponding to unit virtual asset Ai, i is a positive integer less than or equal to S; combining the data feature vectors respectively corresponding to the S unit virtual assets with the weight model parameters respectively corresponding to the S unit virtual assets to obtain the fused feature vectors respectively corresponding to the S unit virtual assets comprises:
  determining an association degree between a recognition demand type indicated by the service processing instruction and unit virtual asset Ai, and allocating a data association weight to unit virtual asset Ai according to the association degree; and
  concatenating data feature vector Ci and weight model parameter Di to obtain a data concatenating feature, and determining a product of the data concatenating feature and the data association weight as a fused feature vector corresponding to unit virtual asset Ai.

6. The method of claim 1, wherein the target processing network is a pricing prediction network;
  wherein performing feature processing on the S fused feature vectors and the prompt text via the target processing network to obtain the feature processing result comprises:
  performing feature extraction on the prompt text to obtain a prompt text feature;
  obtaining environmental factor information about an object to be priced indicated by the prompt text, according to a search engine associated with the pricing prediction network; and
  performing feature extraction on the environment factor information to obtain an environment factor feature, and fusing the environment factor feature, the prompt text feature, and the S fused feature vectors to obtain the feature processing result;
  wherein classifying and recognizing the feature processing result to obtain the data recognition result for responding to the service processing instruction comprises:
  obtaining P price range labels corresponding to the pricing prediction network and predicted market information respectively corresponding to the P price range labels, and respectively performing feature extraction on the P pieces of predicted market information to obtain P market price features; wherein P is a positive integer;
  performing cross attention processing on the feature processing result and the P market price features to obtain P first cross attention scores; and
  determining a price range label corresponding to predicted market information associated with a first target cross attention score as the data recognition result for responding to the service processing instruction, wherein the first target cross attention score is a maximum first cross attention score of the P first cross attention scores.

7. The method of claim 6, wherein performing cross attention processing on the feature processing result and the P market price features to obtain the P first cross attention scores comprises:
  combining the P market price features to obtain a price combination feature;
  using the feature processing result as a query vector in a cross-attention function, using the price combination feature as a key vector in the cross-attention function, and using the price combination feature as a value vector in the cross-attention function;
  determining a product of the query vector and the key vector as a first fused feature through the cross-attention function;
  obtaining a number of dimensions corresponding to the price combination feature, and determining a product of the first fused feature and a reciprocal of the number of dimensions as a second fused feature;
  transforming the second fused feature into a first activation feature according to an activation subfunction of the cross attention function; and
  determining a product of the first activation feature and the value vector as an attention processing sequence, wherein the attention processing sequence comprises P first cross attention scores.

8. The method of claim 1, wherein the target processing network is a data analysis network; wherein performing feature processing on the S fused feature vectors and the prompt text via the target processing network to obtain the feature processing result comprises:
  performing feature extraction on the prompt text to obtain a prompt text feature; and
  fusing the prompt text feature and the S fused feature vectors to obtain the feature processing result;
  wherein classifying and recognizing the feature processing result to obtain the data recognition result for responding to the service processing instruction comprises:

obtaining Q data classification labels corresponding to the data analysis network and label-associated information respectively corresponding to the Q data classification labels, and respectively performing feature extraction on the Q label-associated information to obtain Q data classification features, wherein Q is a positive integer;

performing cross attention processing on the feature processing result and the Q data classification features to obtain Q second cross attention scores; and determining a data classification label corresponding to label-associated information associated with a second target cross attention score as the data recognition result for responding to the service processing instruction, wherein the second target cross attention score is a maximum cross attention score of the Q second cross attention scores.

9. The method of claim 1, further comprising:

performing information retrieval on the data recognition result and the prompt text via a large language model to obtain an information retrieval result;

obtaining a template library associated with the target processing network, and obtaining, from the template library, a service template corresponding to the prompt text; and determining a text to be updated in the service template, replacing the text to be updated in the service template according to the data recognition result and the information retrieval result to obtain an updated service text, and determining the updated service text as a service result for the service processing instruction.

10. The method of claim 1, further comprising:

in response to the recognition demand type indicated by the prompt text comprising a drawing processing demand, recognizing a drawing image type according to the drawing processing demand, obtaining, from an image template library, an image template of the drawing image type, and generating a Gaussian noise image according to the image template and initial noise data;

inputting the data recognition result and the prompt text into a large language model, and fusing and expanding the data recognition result and the prompt text via the large language model to obtain a drawing indication text;

inputting the Gaussian noise image and the drawing indication text into a text-to-image model, performing feature extraction on the Gaussian noise image via the text-to-image model to obtain a Gaussian noise feature, and performing forward diffusion processing on the Gaussian noise feature to obtain a forward noise vector;

performing feature coding on the drawing indication text via the text-to-image model to obtain a drawing text feature, and performing denoising processing on the Gaussian noise image according to the forward noise vector and the drawing text feature to obtain a drawing data graph; and determining the data recognition result and the drawing data graph as a service result for the service processing instruction.

11. A method for data processing, comprising:

obtaining a sample processing instruction, virtual asset sample data of a sample aircraft, and a sample recognition result, and inputting the sample processing instruction and the virtual asset sample data of the sample aircraft to an initial service processing model, wherein the sample aircraft is composed of at least two sample components;

obtaining an asset data classification rule, performing data division on the virtual asset sample data of the sample aircraft according to N service types in the asset data classification rule and the at least two sample components to obtain R unit sample virtual assets, and determining sample binary group classification information corresponding to each of the R unit sample virtual assets; wherein the sample binary group classification information indicates a service type and a sample component to which a unit sample virtual asset belongs, and N and R are both positive integers;

respectively allocating a random initialization model parameter for the binary group classification information corresponding to each of the R unit sample virtual assets, and determining R initialization model parameters as an initialization model parameter set;

combining sample feature vectors respectively corresponding to the R unit sample virtual assets and the initialization model parameters respectively corresponding to the R unit sample virtual assets to obtain sample fused feature vectors respectively corresponding to the R unit sample virtual assets; wherein a sample fused feature vector is composed of a sample feature vector and an initialization model parameter;

generating a sample prompt text indicating a sample recognition demand type according to the sample processing instruction, determining a sample processing network corresponding to the sample recognition demand type from the initial service processing model according to the sample prompt text, performing feature processing on the R sample fused feature vectors and the sample prompt text via the sample processing network to obtain a sample feature processing result, and classifying and recognizing the sample feature processing result to obtain a sample prediction result for responding to the sample processing instruction; and generating a model loss value according to the sample prediction result and the sample recognition result, and obtaining a target service processing model by adjusting each initialization model parameter in the initialization model parameter set and parameters of the sample processing network according to the model loss value until the initialization service processing model satisfies a model convergence condition; wherein the target service processing model comprises a weight model parameter set, the weight model parameter set comprises a weight model parameter obtained after adjusting the initialization model parameter.

12. A computer, comprising a processor, a memory, and an input/output interface;

wherein the processor is respectively connected to the memory and the input/output interface, the input/output interface is configured to receive and output data, the memory is configured to store a computer program, and the processor is configured to invoke the computer program to make the computer execute:

obtaining a service processing instruction and virtual asset-associated data of an aircraft sent by a first service object, and inputting the service processing instruction and the virtual asset-associated data of the aircraft to a target service processing model; wherein the aircraft is composed of at least two components;

obtaining an asset data classification rule, performing data division on the virtual asset-associated data of the aircraft according to N service types in the asset data classification rule and the at least two components to obtain S unit virtual assets, and determining binary group classification information corresponding to each of the S unit virtual assets; wherein the binary group classification information indicates a service type and a component to which a unit virtual asset belongs, and N and S are both positive integers;

obtaining weight model parameters respectively corresponding to the S unit virtual assets from a weight model parameter set in the target service processing model according to binary group classification information respectively corresponding to the S unit virtual assets; wherein the weight model parameter set comprises H weight model parameters respectively representing different influence weights, each weight model parameter corresponds to one piece of binary group classification information, and H is a positive integer;

combining data feature vectors respectively corresponding to the S unit virtual assets with the weight model parameters respectively corresponding to the S unit virtual assets to obtain fused feature vectors respectively corresponding to the S unit virtual assets; wherein a fused feature vector is composed of a data feature vector and a weight model parameter;

generating a prompt text for indicating a recognition demand type according to the service processing instruction, determining a target processing network corresponding to the recognition demand type from the target service processing model according to the prompt text, and performing feature processing on the S fused feature vectors and the prompt text via the target processing network, to obtain a feature processing result;

classifying and recognizing the feature processing result to obtain a data recognition result for responding to the service processing instruction.

13. The computer of claim 12, wherein in terms of performing data division on the virtual asset-associated data of the aircraft according to the N service types in the asset data classification rule and the at least two components to obtain the S unit virtual assets, and determining binary group classification information corresponding to each of the S unit virtual assets, the processor is configured to invoke the computer program to make the computer execute:

classifying the virtual asset-associated data of the aircraft according to the N service types in the asset data classification rule to obtain M types of classified data; wherein service types respectively corresponding to the M types of classified data belong to the N service types, M is a positive integer less than or equal to N;

in each type of classified data, performing component division on each type of classified data according to the at least two components, to obtain the S unit virtual assets; wherein one unit virtual asset corresponds to one service type and one component;

obtaining service types and components respectively corresponding to the S unit virtual assets, and combining the service types and the components respectively corresponding to the S unit virtual assets to obtain binary group classification information respectively corresponding to the S unit virtual assets.

14. The computer of claim 13, wherein the N service types comprise an asset service data type, a basic service data type, and a transaction service data type; and in response to M being equal to N, the M types of classified data comprise first classified data, second classified data and third classified data; wherein in terms of classifying the virtual asset-associated data of the aircraft according to the N service types in the asset data classification rule to obtain the M types of classified data, the processor is configured to invoke the computer program to make the computer execute:

obtaining a data key field corresponding to the asset service data type, wherein the data key field comprises a usage record key field, a maintenance record key field, and a depreciation record key field;

obtaining, from the virtual asset-associated data of the aircraft, a historical usage record corresponding to the usage record key field, a historical maintenance record corresponding to the maintenance record key field, and a historical depreciation record corresponding to the depreciation record key field, and determining the historical usage record, the historical maintenance record, and the historical depreciation record as the first classified data corresponding to the asset service data type;

obtaining a factory key field corresponding to the basic service data type, obtaining, from the virtual asset-associated data of the aircraft, factory-associated data corresponding to the factory key field, and determining the factory-associated data as the second classified data corresponding to the basic service data type; and obtaining a transaction key field corresponding to the transaction service data type, obtaining, from the virtual asset-associated data of the aircraft, transaction-associated data corresponding to the transaction key field, and determining the transaction-associated data as the third classified data corresponding to the transaction service data type.

15. The computer of claim 12, wherein the binary group classification information respectively corresponding to the S units of virtual assets comprises binary group classification information Bi, wherein i is a positive integer less than or equal to S; in terms of obtaining the weight model parameters respectively corresponding to the S unit virtual assets from the weight model parameter set in the target service processing model according to the binary group classification information respectively corresponding to the S unit virtual assets, the processor is configured to invoke the computer program to make the computer execute:

obtaining the weight model parameter set and a parameter matching rule in the target service processing model, wherein the parameter matching rule indicates a mapping relationship between weight model parameters in the weight model parameter set and binary group classification information;

determining a binary group classification information set according to the weight model parameter set and the parameter matching rule;

determining binary group classification information in the binary group classification information set that matches binary group classification information Bi as target binary group classification information; and obtaining, from the weight model parameter, a target weight model parameter corresponding to the target binary group classification information according to the target binary group classification information and the parameter matching rule, and determining the target weight model parameter as a weight model parameter corresponding to binary group classification information Bi.

16. The computer of claim 12, wherein the S unit virtual assets comprise unit virtual asset Ai, the data feature vectors respectively corresponding to the S unit virtual assets comprise data feature vector Ci corresponding to unit virtual asset Ai, the weight model parameters respectively corresponding to the S unit virtual assets comprise weight model parameter Di corresponding to unit virtual asset Ai, i is a positive integer less than or equal to S; in terms of combining the data feature vectors respectively corresponding to the S unit virtual assets with the weight model parameters respectively corresponding to the S unit virtual assets to obtain the fused feature vectors respectively corresponding to the S unit virtual assets, the processor is configured to invoke the computer program to make the computer execute:
- determining an association degree between a recognition demand type indicated by the service processing instruction and unit virtual asset Ai, and allocating a data association weight to unit virtual asset Ai according to the association degree; and
- concatenating data feature vector Ci and weight model parameter Di to obtain a data concatenating feature, and determining a product of the data concatenating feature and the data association weight as a fused feature vector corresponding to unit virtual asset Ai.

17. The computer of claim 12, wherein the target processing network is a pricing prediction network;
wherein in terms of performing feature processing on the S fused feature vectors and the prompt text via the target processing network to obtain the feature processing result, the processor is configured to invoke the computer program to make the computer execute:
performing feature extraction on the prompt text to obtain a prompt text feature;
obtaining environmental factor information about an object to be priced indicated by the prompt text, according to a search engine associated with the pricing prediction network; and
performing feature extraction on the environment factor information to obtain an environment factor feature, and fusing the environment factor feature, the prompt text feature, and the S fused feature vectors to obtain the feature processing result;
wherein in terms of classifying and recognizing the feature processing result to obtain the data recognition result for responding to the service processing instruction, the processor is configured to invoke the computer program to make the computer execute:
obtaining P price range labels corresponding to the pricing prediction network and predicted market information respectively corresponding to the P price range labels, and respectively performing feature extraction on the P pieces of predicted market information to obtain P market price features; wherein P is a positive integer;
performing cross attention processing on the feature processing result and the P market price features to obtain P first cross attention scores; and
determining a price range label corresponding to predicted market information associated with a first target cross attention score as the data recognition result for responding to the service processing instruction, wherein the first target cross attention score is a maximum first cross attention score of the P first cross attention scores.

18. The computer of claim 17, wherein in terms of performing cross attention processing on the feature processing result and the P market price features to obtain the P first cross attention scores, the processor is configured to invoke the computer program to make the computer execute:
combining the P market price features to obtain a price combination feature;
using the feature processing result as a query vector in a cross-attention function, using the price combination feature as a key vector in the cross-attention function, and using the price combination feature as a value vector in the cross-attention function;
determining a product of the query vector and the key vector as a first fused feature through the cross-attention function;
obtaining a number of dimensions corresponding to the price combination feature, and determining a product of the first fused feature and a reciprocal of the number of dimensions as a second fused feature;
transforming the second fused feature into a first activation feature according to an activation subfunction of the cross attention function; and
determining a product of the first activation feature and the value vector as an attention processing sequence, wherein the attention processing sequence comprises P first cross attention scores.

19. The computer of claim 12, wherein the target processing network is a data analysis network;
wherein in terms of performing feature processing on the S fused feature vectors and the prompt text via the target processing network to obtain the feature processing result, the processor is configured to invoke the computer program to make the computer execute:
performing feature extraction on the prompt text to obtain a prompt text feature; and
fusing the prompt text feature and the S fused feature vectors to obtain the feature processing result;
wherein in terms of classifying and recognizing the feature processing result to obtain the data recognition result for responding to the service processing instruction, the processor is configured to invoke the computer program to make the computer execute:
obtaining Q data classification labels corresponding to the data analysis network and label-associated information respectively corresponding to the Q data classification labels, and respectively performing feature extraction on the Q label-associated information to obtain Q data classification features, wherein Q is a positive integer;
performing cross attention processing on the feature processing result and the Q data classification features to obtain Q second cross attention scores; and
determining a data classification label corresponding to label-associated information associated with a second target cross attention score as the data recognition result for responding to the service processing instruction, wherein the second target cross attention score is a maximum cross attention score of the Q second cross attention scores.

20. The computer of claim 12, wherein the processor is configured to invoke the computer program to make the computer execute:
performing information retrieval on the data recognition result and the prompt text via a large language model to obtain an information retrieval result;
obtaining a template library associated with the target processing network, and obtaining, from the template library, a service template corresponding to the prompt text; and
determining a text to be updated in the service template, replacing the text to be updated in the service template according to the data recognition result and the information retrieval result to obtain an updated service text, and determining the updated service text as a service result for the service processing instruction.

* * * * *